United States Patent
Funakubo

(10) Patent No.: US 7,248,735 B2
(45) Date of Patent: Jul. 24, 2007

(54) COMPRESSION AND DECOMPRESSION METHOD OF IMAGE DATA

(75) Inventor: Noriyuki Funakubo, Hamakita (JP)

(73) Assignee: Yamaha Corporation, Hamamatsu-shi (JP)

( * ) Notice: Subject to any disclaimer, the term of this patent is extended or adjusted under 35 U.S.C. 154(b) by 722 days.

(21) Appl. No.: 10/638,640

(22) Filed: Aug. 11, 2003

(65) Prior Publication Data

US 2005/0012645 A1 Jan. 20, 2005

(30) Foreign Application Priority Data

Aug. 12, 2002 (JP) ............................. 2002-234984

(51) Int. Cl.
*G06K 9/36* (2006.01)

(52) U.S. Cl. ...................... 382/166; 382/232; 382/240

(58) Field of Classification Search ................ 382/162, 382/166, 232, 233, 240; 341/67
See application file for complete search history.

(56) References Cited

U.S. PATENT DOCUMENTS

| | | | |
|---|---|---|---|
| 5,497,153 A | 3/1996 | Jeong | 341/67 |
| 5,602,549 A | 2/1997 | Jeong | 341/67 |
| 5,654,706 A | 8/1997 | Jeong | 341/67 |
| 5,714,950 A | 2/1998 | Jeong | 341/67 |
| 6,757,437 B1 * | 6/2004 | Keith et al. | 382/240 |
| 6,804,402 B2 * | 10/2004 | Andrew | 382/240 |

FOREIGN PATENT DOCUMENTS

JP            06-125278            5/1994

OTHER PUBLICATIONS

Notice of Rejection from Japan Patent Office dated Apr. 12, 2005.

* cited by examiner

*Primary Examiner*—Duy M. Dang
(74) *Attorney, Agent, or Firm*—Pillsbury Winthrop Shaw Pittman LLP

(57) ABSTRACT

A compressing method of image data is carried out by a first process of dividing the image data into a plurality of blocks, a second process of linearly scanning the image data within the block by a given scan method defining a pattern of linearly scanning the image data of the block so as to arrange the image data in series, and a third process of compressing the arranged image data so as to reduce an amount of the image data of the block. The second process and the third process are repeatedly applied to the same block with using different scan methods defining different patterns of linearly scanning the image data, then an optimum one of the different scan methods is selected, which succeeds in most reducing the amount of the image data, and the compressed image data arranged by the selected scan method is outputted together with indication of the selected scan method.

38 Claims, 11 Drawing Sheets

CODING FORMATS (a) | 0 | 0 | ORL |
       zero_th (b) | 0 | 0 | all 0 |   | ORL |
       zero_th              zero_max (c) | 0 | 1 | s |

(d) | 1 | 0 | val |
          code_th (e) | 1 | 1 | val |
          code_max

COMPRESSION AND DECOMPRESSION METHOD OF IMAGE DATA

BACKGROUND OF THE INVENTION

1. Technical Field of the Invention

The present invention relates to a compression method of highly efficiently compressing color image data, a decompression apparatus and a decompression program to decompress back the image data compressed by the compression method to the original color image data.

2. Prior Art

There are known the following methods as conventional methods of compressing color image data.

(1) Cell Reference Method and Line Reference Method

These methods are effective for a solid picture composed of pixels or dots having the same color code, but cannot improve the compression ratio if there are no preceding or succeeding dots having the same color code. Further, these methods are incapable of irreversible or lossy compression and highly efficient compression of RGB image data.

(2) Dictionary Method

A large dictionary is needed for improving the reproducibility of the image data. This method complies with the reversible or lossless compression like the cell reference method and the line reference method, and is therefore incapable of the irreversible or lossy compression and highly efficient compression of RGB image data.

(3) DCT Transform+Huffman Coding (JPEG: Joint Photographic image Coding Experts Group)

Since this method forms a block of 8×8 dots size to perform the DCT (Discrete Cosine Transform), a block-based distortion becomes more apparent as the compression ratio increases. Since a sine wave is essentially used for approximation, it is impossible to delicately approximate an edgy portion such as an animation image. Further, since a Huffman table is needed for Huffman coding, processing such as table referencing is disadvantageous to the use of hardware. In addition, this method is incapable of lossless compression of indexed image data based on the color palette transform.

(4) Wavelet Transform+Arithmetic Coding (JPEG2000)

The two-dimensional wavelet transform for image compression requires a memory equivalent to the total pixel size as a buffer. Accordingly, this method is inappropriate for the use of hardware components and consumes a long conversion time. The arithmetic coding requires complicated operations and is subject to time-consuming decoding especially for the bit-plane-based coding such as JPEG2000. The wavelet transform uses the image correlation like the DCT, and is therefore unsuitable for lossless compression of indexed image data.

SUMMARY OF THE INVENTION

The present invention has been made in consideration of the foregoing. It is therefore an object of the present invention to provide a method and an apparatus for image data compression/decompression capable of the reversible or lossless compression of image data of an index format and the irreversible or lossy compression or highly efficient compression of RGB image data. It is another object of the present invention to provide a method and an apparatus for image data compression/decompression capable of fast decompressing image data with simple processing without the need for tables or complicated operations.

An inventive method of compressing image data comprises a first process of dividing the image data into a plurality of blocks, a second process of linearly scanning the image data within the block by a given scan method defining a pattern of linearly scanning the image data of the block so as to arrange the image data in series, and a third process of compressing the arranged image data so as to reduce an amount of the image data of the block, wherein the second process and the third process are repeatedly applied to the same block with using different scan methods defining different patterns of linearly scanning the image data, then an optimum one of the different scan methods is selected, which succeeds in most reducing the amount of the image data, and the compressed image data arranged by the selected scan method is outputted together with indication of the selected scan method.

Preferably, the inventive method further comprises a conversion process performed between the first process and the second process for converting a format of the image data from an initial RGB format to a YUV format suitable for the compressing performed by the third process.

Preferably, in the inventive method, the third process includes a wavelet transform process for applying a wavelet transform to the image data arranged in series. Further, the third process includes a quantizing process for performing quantization of the image data after the wavelet transform, a differential process for performing differential operation of the image data after the quantization, and a coding process for performing coding of the image data after the differential operation.

Another inventive method is designed for applying either of a reversible compression and an irreversible compression to image data in response to a compressing instruction. The inventive method comprises a first process of dividing the image data into a plurality of blocks, a second process of linearly scanning the image data within the block by a given scan method defining a pattern of linearly scanning the image data of the block so as to arrange the image data in series, a third process of applying a wavelet transform to the image data obtained by the second process, a fourth process of performing quantization of the image data after the wavelet transform, a fifth process of performing differential operation of the image data after the quantization, and a sixth process of performing coding of the image data after the differential operation, wherein the inventive method responds when the compressing instruction indicates the irreversible compression for repeatedly applying the first process through sixth process to the same block so as to reduce an amount of the image data by the irreversible compression while using different scan methods defining different patterns of linearly scanning the image data, then selecting an optimum one of the different scan methods, which succeeds in most reducing the amount of the image data, and outputting the irreversibly compressed image data after arranged by the selected scan method together with indication of the selected scan method, and wherein the inventive method responds when the compressing instruction indicates the reversible compression for repeatedly applying the first process, second process, fifth process and sixth process to the same block with skipping the third process and fourth process so as to reduce an amount of the image data by the reversible compression while using different scan methods defining different patterns of linearly scanning the image data, then selecting an optimum one of the different scan methods, which succeeds in most reducing the amount of the image data, and outputting the reversibly compressed image data after arranged by the selected scan method together with indication of the selected scan method.

Preferably, the inventive method further comprises a conversion process performed between the first process and the second process for converting a format of the image data from an initial RGB format to a YUV format suitable for the wavelet transform.

Preferably, the inventive method further comprises a threshold process performed between the fourth process and the fifth process for thresholding the image data representing a plurality of numerical values such as to replace each numerical value less than a predetermined threshold value by the 0 value.

Preferably, the inventive method further comprises a process of creating mask data which defines a mask pattern corresponding to a portion of the image data requiring the reversible compression, wherein the method applies the first process, second process, fifth process and sixth process to the mask data so as to reduce an amount of the mask data by the reversible compression, and outputs the reversibly compressed mask data together with the compressed image data.

Preferably in the inventive method, the sixth process performs the coding on the image data containing a continuous series of 0 data such that the continuous series of the 0 data is replaced by a combination of a first specific code indicating the continuous series of the 0 data and a number of the 0 data constituting the continuous series.

Preferably in the inventive method, the sixth process performs the coding on the image data containing a short continuous series of 0 data where a number of 0 data is not more than a reference zero run length and a long continuous series of 0 data where a number of 0 data is more than the reference zero run length, such that the short continuous series is replaced by a combination of a first specific code indicating the short continuous series and the number of the 0 data thereof denoted by a reduced bit length, and the long continuous series is replaced by a combination of the first specific code with an additional code discriminating the long continuous series from the short continuous series and the number of the 0 data thereof denoted by a bit length longer than the reduced bit length. In such a case, the sixth process performs the coding on the image data while changing the reference zero run length so as to detect an optimum reference zero run length, by which the amount of the image data is most reduced.

Preferably in the inventive method, the sixth process performs the coding on the image data arranged in the series containing a preceding data and a succeeding data which is immediately after the preceding data and which has an absolute value identical to that of the preceding data, such that the succeeding data is replaced by a combination of a second specific code indicating that the absolute value of the succeeding data is identical to that of the preceding data and a sign bit indicating a sign of the succeeding data.

Preferably in the inventive method, the sixth process performs the coding on the image data containing an insignificant data having a small value not more than a reference value and a significant data having a great value more than the reference value, such that the insignificant data is replaced by a combination of a third specific code indicating the insignificant data and the small value thereof denoted by a reduced bit length, and the significant data is replaced by a combination of a fourth specific code indicating the significant data and the great value thereof denoted by a bit length longer than the reduced bit length. In such a case, the sixth process performs the coding on the image data while changing the reference value so as to detect an optimum reference value, by which the amount of the image data is most reduced.

An inventive decompression apparatus is provided for decompressing image data which is provided in a compressed form together with indication of a scan method applied to the image data, which is compressed by a dividing process of dividing the image data into a plurality of blocks, a scanning process of linearly scanning the image data within the block by a given scan method defining a pattern of linearly scanning the image data of the block so as to arrange the image data in series, and a compressing process of compressing the arranged image data so as to reduce an amount of the image data of the block, wherein the scanning process and the compressing process are repeatedly applied to the same block with using different scan methods defining different patterns of linearly scanning the image data, then an optimum one of the different scan methods is selected, which succeeds in most reducing the amount of the image data, and the compressed image data arranged by the selected scan method is provided together with indication of the selected scan method. The inventive decompression apparatus comprises a decompressing section that decompresses the image data by reversely performing the compressing process, a rearranging section that rearranges the series of the decompressed image data by an order reverse to that defined by the selected scanning method so as to restore each of the blocks, and a storing section that collectively stores the restored blocks of the image data.

Preferably in the inventive decompression apparatus, the compression process includes a quantizing process for performing quantization of the image data, and wherein the decompressing section decompresses the image data by reversely performing the quantizing process on the image data. Further, the compression process includes a wavelet transform process for applying a wavelet transform to the image data, and wherein the decompressing section decompresses the image data by reversely performing the wavelet transform on the image data.

Another inventive decompression apparatus is provided for decompressing image data which is provided in a compressed form together with indication of a scan method and a compressing instruction applied to the image data, which has been compressed by a compression method comprising a dividing process of dividing the image data into a plurality of blocks, a scanning process of linearly scanning the image data within the block by a given scan method defining a pattern of linearly scanning the image data of the block so as to arrange the image data in series, a transform process of applying a wavelet transform to the image data obtained by the scanning process, a quantizing process of performing quantization of the image data after the wavelet transform, a differential process of performing differential operation of the image data after the quantization, and a coding process of performing coding of the image data after the differential operation, wherein the compression method responds when the compressing instruction indicates an irreversible compression for repeatedly applying the dividing process, scanning process, transform process, quantizing process, differential process and coding process to the same block so as to reduce an amount of the image data by the irreversible compression while using different scan methods defining different patterns of linearly scanning the image data, then selecting an optimum one of the different scan methods, which succeeds in most reducing the amount of the image data, and outputting the irreversibly compressed image data after arranged by the selected scan method together with indication of the selected scan method, and wherein the compression method responds when the compressing instruction indicates a reversible compression for repeatedly applying the dividing process, scanning process, differential process and coding process to the same block with skipping the transform process and quantizing process so as to reduce an amount of the image data by the reversible compression while using different scan methods defining different patterns of linearly scanning the image data, then selecting an optimum one of the different scan methods, which succeeds in most reducing the amount of the image data, and outputting the reversibly compressed image data after arranged by the selected scan method together with indication of the selected scan method. The inventive decompression apparatus comprises a first decoding section that decodes the image data by reversely performing the coding applied to the compressed image data, an adding section that performs adding operation of the decoded image data to remove the differential operation applied to the image data, a second decoding section being operative when the compressing instruction indicates that the image data has been irreversibly compressed for performing a reverse quantization and a reverse wavelet transform to the image data fed from the adding section so as to decompress the image data, and being operative when the compressing instruction indicates that the image data has been reversibly compressed for applying no operation to the image data fed from the adding section, a rearranging section that rearranges the series of the image data fed from the second decoding section by an order reverse to that defined by the selected scanning method so as to restore each of the blocks, and a storing section that stores each of the restored blocks to thereby obtain an expanded form of the compressed image data.

Preferably, the inventive compression method further comprises a conversion process performed between the dividing process and the scanning process for converting a format of the image data from an initial RGB format to a YUV format suitable for the wavelet transform, the decompression apparatus further comprising a converting section that converts back the YUV format of the image data fed from the second decoding section into the initial RGB format, and that provides the image data of the RGB format to the storing section.

Preferably in the inventive decompression apparatus, the coding process has performed the coding on the image data containing a continuous series of 0 data such that the continuous series of the 0 data has been replaced by a combination of a first specific code indicating the continuous series of the 0 data and an additional data indicating a number of the 0 data constituting the continuous series. Accordingly, the first decoding section operates when the first specific code is detected in the compressed image data for restoring the continuous series of the 0 data having the number of the 0 data indicated by the additional data.

Preferably, the coding process has performed the coding on the image data containing a short continuous series of 0 data where a number of 0 data is not more than a reference zero run length and a long continuous series of 0 data where a number of 0 data is more than the reference zero run length, such that the short continuous series has been replaced by a combination of a first specific code indicating the short continuous series and an additional data denoting the number of the 0 data by a reduced bit length, and the long continuous series has been replaced by a combination of the first specific code with an additional code discriminating the long continuous series from the short continuous series and an additional data denoting the number of the 0 data by a bit length longer than the reduced bit length. Accordingly, the first decoding section operates when the first specific code is detected in the compressed image data for restoring the short continuous series of the 0 data having the number of the 0 data indicated by the additional data, and the first decoding section operates when the first specific code attached with the additional code is detected in the compressed image data for restoring the long continuous series of the 0 data having the number of the 0 data indicated by the additional data.

Preferably, the coding process has performed the coding on the image data arranged in the series containing a preceding data and a succeeding data which is immediately after the preceding data and which has an absolute value identical to that of the preceding data, such that the succeeding data is replaced by a combination of a second specific code indicating that the absolute value of the succeeding data is identical to that of the preceding data and a sign bit indicating a sign of the succeeding data. Accordingly, the first decoding section operates when the second specific code is detected together with the sign bit after the preceding data in the compressed image data for restoring the succeeding data having the absolute value identical to that of the preceding data and having the sign indicated by the sign bit.

Preferably, the coding process has performed the coding on the image data containing an insignificant data having a small value not more than a reference value and a significant data having a great value more than the reference value, such that the insignificant data is replaced by a combination of a third specific code indicating the insignificant data and an additional data denoting the small value thereof by a reduced bit length, and the significant data is replaced by a combination of a fourth specific code indicating the significant data and an additional data denoting the great value thereof by a bit length longer than the reduced bit length. Accordingly, the first decoding section operates when the third specific code is detected together with the additional data for restoring the insignificant data having the small value denoted by the additional data, and the first decoding section operates when the fourth specific code is detected together with the additional data for restoring the significant data having the great value denoted by the additional data.

An inventive decompression program is executable in a decompression apparatus for decompressing image data which is provided in a compressed form together with indication of a scan method applied to the image data, which has been compressed by a dividing process of dividing the image data into a plurality of blocks, a scanning process of linearly scanning the image data within the block by a given scan method defining a pattern of linearly scanning the image data of the block so as to arrange the image data in series, and a compressing process of compressing the arranged image data so as to reduce an amount of the image data of the block, wherein the scanning process and the compressing process are repeatedly applied to the same block with using different scan methods defining different patterns of linearly scanning the image data, then an optimum one of the different scan methods is selected, which succeeds in most reducing the amount of the image data, and the compressed image data arranged by the selected scan method is provided together with indication of the selected scan method. The inventive decompression program is executed to perform a decompression method comprising a decompressing process for decompressing the image data by reversely performing the compressing process, a rearranging process for rearranging the series of the decompressed image data by an order reverse to that defined by the selected scanning method so as to restore each of the blocks, and a storing process for collectively storing the restored blocks of the image data.

Preferably, the compression process includes a quantizing process for performing quantization of the image data. Accordingly, the decompressing process decompresses the image data by reversely performing the quantizing process on the image data. Preferably, the compression process further includes a wavelet transform process for applying a wavelet transform to the image data. Accordingly, the decompressing process decompresses the image data by reversely performing the wavelet transform on the image data.

Another inventive decompression program is executable in a decompression apparatus for decompressing image data which is provided in a compressed form together with indication of a scan method and a compressing instruction applied to the image data, which has been compressed by a compression method comprising a dividing process of dividing the image data into a plurality of blocks, a scanning process of linearly scanning the image data within the block by a given scan method defining a pattern of linearly scanning the block so as to arrange the image data in series, a transform process of applying a wavelet transform to the image data obtained by the scanning process, a quantizing process of performing quantization of the image data after the wavelet transform, a differential process of performing differential operation of the image data after the quantization, and a coding process of performing coding of the image data after the differential operation, wherein the compression method responds when the compressing instruction indicates an irreversible compression for repeatedly applying the dividing process, scanning process, transform process, quantizing process, differential process and coding process to the same block so as to reduce an amount of the image data by the irreversible compression while using different scan methods defining different patterns of linearly scanning the image data, then selecting an optimum one of the different scan methods, which succeeds in most reducing the amount of the image data, and outputting the irreversibly compressed image data after arranged by the selected scan method together with indication of the selected scan method, and wherein the compression method responds when the compressing instruction indicates a reversible compression for repeatedly applying the dividing process, scanning process, differential process and coding process to the same block with skipping the transform process and quantizing process so as to reduce an amount of the image data by the reversible compression while using different scan methods defining different patterns of linearly scanning the image data, then selecting an optimum one of the different scan methods, which succeeds in most reducing the amount of the image data, and outputting the reversibly compressed image data after arranged by the selected scan method together with indication of the selected scan method. The inventive decompression program is executable to perform a decompression method comprising a first decoding process for decoding the image data by reversely performing the coding applied to the compressed image data, an adding process for performing adding operation of the decoded image data to remove the differential operation applied to the image data, a second decoding process being commenced when the compressing instruction indicates that the image data has been irreversibly compressed for performing a reverse quantization and a reverse wavelet transform to the image data fed from the adding process so as to decompress the image data, and being commenced when the compressing instruction indicates that the image data has been reversibly compressed for applying no operation to the image data fed from the adding process, a rearranging process for rearranging the series of the image data fed from the second decoding process by an order reverse to that defined by the selected scanning method so as to restore each of the blocks, and a storing process for storing each of the restored blocks to thereby obtain an expanded form of the compressed image data.

Preferably, the compression method further comprises a conversion process performed between the dividing process and the scanning process for converting a format of the image data from an initial RGB format to a YUV format suitable for the wavelet transform, and wherein the decompression method further comprises a converting process for converting back the YUV format of the image data fed from the second decoding process into the initial RGB format, and for providing the image data of the RGB format to the storing process.

Preferably, the coding process has performed the coding on the image data containing a continuous series of 0 data such that the continuous series of the 0 data has been replaced by a combination of a first specific code indicating the continuous series of the 0 data and an additional data indicating a number of the 0 data constituting the continuous series. Correspondingly, the first decoding process is performed when the first specific code is detected in the compressed image data for restoring the continuous series of the 0 data having the number of the 0 data indicated by the additional data.

Preferably, the coding process has performed the coding on the image data containing a short continuous series of 0 data where a number of 0 data is not more than a reference zero run length and a long continuous series of 0 data where a number of 0 data is more than the reference zero run length, such that the short continuous series has been replaced by a combination of a first specific code indicating the short continuous series and an additional data denoting the number of the 0 data by a reduced bit length, and the long continuous series has been replaced by a combination of the first specific code with an additional code discriminating the long continuous series from the short continuous series and an additional data denoting the number of the 0 data by a bit length longer than the reduced bit length. Correspondingly, the first decoding process is performed when the first specific code is detected in the compressed image data for restoring the short continuous series of the 0 data having the number of the 0 data indicated by the additional data, and the first decoding process is performed when the first specific code attached with the additional code is detected in the compressed image data for restoring the long continuous series of the 0 data having the number of the 0 data indicated by the additional data.

Preferably, the coding process has performed the coding on the image data arranged in the series containing a preceding data and a succeeding data which is immediately after the preceding data and which has an absolute value identical to that of the preceding data, such that the succeeding data is replaced by a combination of a second specific code indicating that the absolute value of the succeeding data is identical to that of the preceding data and a sign bit indicating a sign of the succeeding data. Correspondingly, the first decoding process is performed when the second specific code is detected together with the sign bit after the preceding data in the compressed image data for restoring the succeeding data having the absolute value identical to that of the preceding data and having the sign indicated by the sign bit.

Preferably, the coding process has performed the coding on the image data containing an insignificant data having a small value not more than a reference value and a significant data having a great value more than the reference value, such that the insignificant data is replaced by a combination of a third specific code indicating the insignificant data and an additional data denoting the small value thereof by a reduced bit length, and the significant data is replaced by a combination of a fourth specific code indicating the significant data and an additional data denoting the great value thereof by a bit length longer than the reduced bit length. Correspondingly, the first decoding process is performed when the third specific code is detected together with the additional data for restoring the insignificant data having the small value denoted by the additional data, and the first decoding process is performed when the fourth specific code is detected together with the additional data for restoring the significant data having the great value denoted by the additional data.

DETAILED DESCRIPTION OF THE EMBODIMENTS

An embodiment of the present invention will be described in further detail with reference to the accompanying drawings.

Referring now to FIGS. 1 through 8, an image data compression method according to the embodiment of the present invention is first described below. This compression method is implemented by hardware or a microprocessor and can compress color image data including RGB (red, green, blue) data, YUV (luminance, chrominance, chrominance) data, and Index data. The method is capable of the lossy compression or highly efficient compression and the lossless compression. The Index data is a code data for specifying colors and needs to be transformed into RGB data based on a color palette for display.

Figure 2:
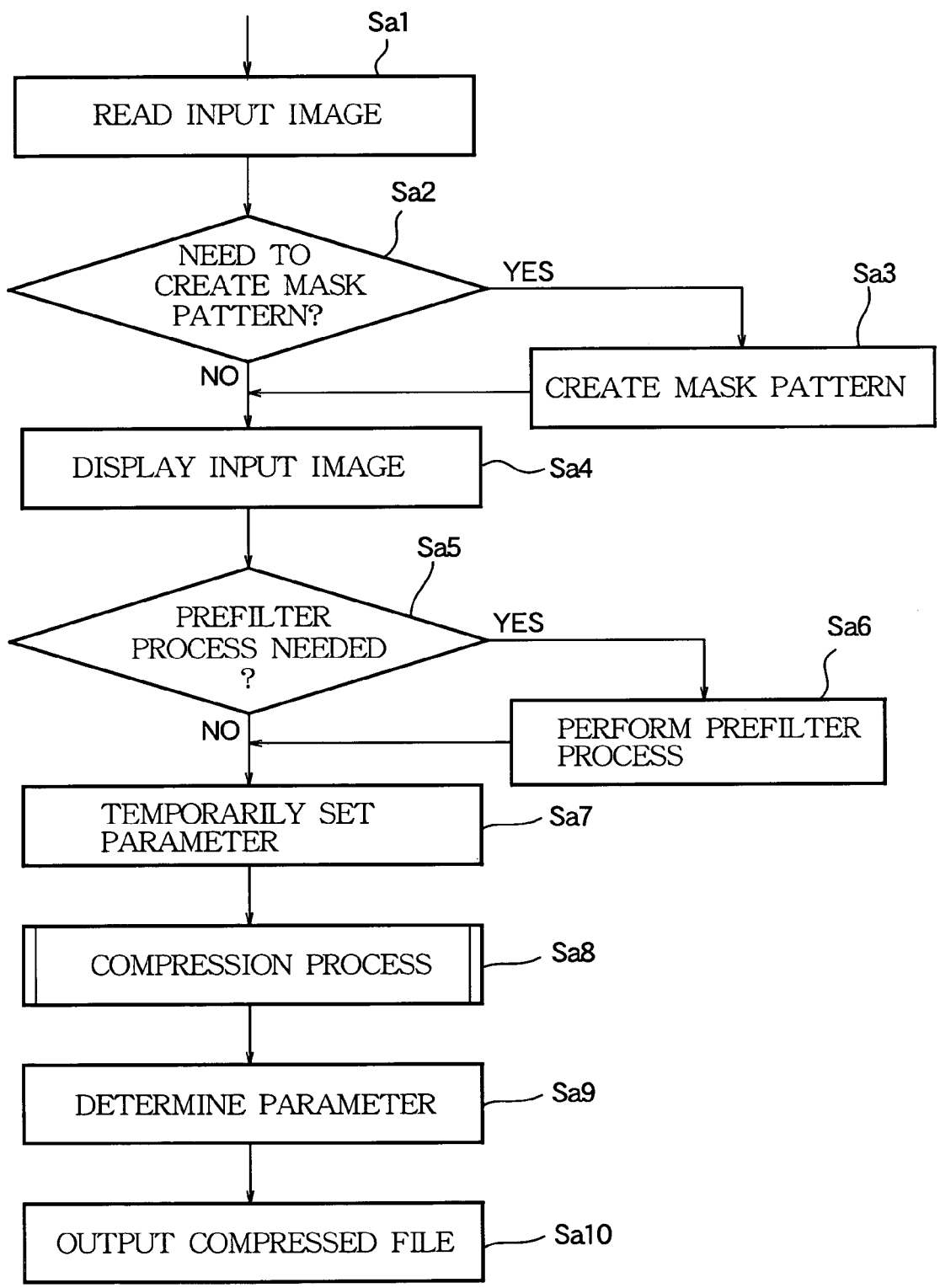
FIG. 2 is a flowchart showing a process of the compression method.

FIG. 2 is a flowchart showing a process of this compression method. The process first reads image data to be compressed (step Sa1). An operator checks whether or not a mask pattern needs to be created (step Sa2). If the mask pattern needs to be created, the operator instructs to create the mask pattern. The mask pattern is created (step Sa3). If the operator gives no instruction, the process advances to the next step. Here, the mask pattern is used to identify a portion that should avoid the lossy compression, e.g., a transparent portion. In this pattern, a portion that should inhibit the lossy compression becomes "1" and a portion that allows the lossy compression becomes "0".

Then, the input image is displayed (step Sa4). The operator checks whether or not a prefilter process is needed (step Sa5). If the prefilter process is needed, the operator instructs to perform the prefilter process. The prefilter process is performed (step Sa6). If the operator gives no instruction, the process advances to the next step. Here, the prefilter process is used to smooth edges of a display image. Performing this process can improve a compression ratio for the lossy compression.

The operator temporarily sets a parameter (step Sa7). The compression process is then performed (step Sa8). The parameter here is used for the compression process. After the compression process is complete, the parameter is determined (step Sa9). The compressed file is output (step Sa10).

The "compression process" at step Sa8 will be described in more detail.

Figure 1:
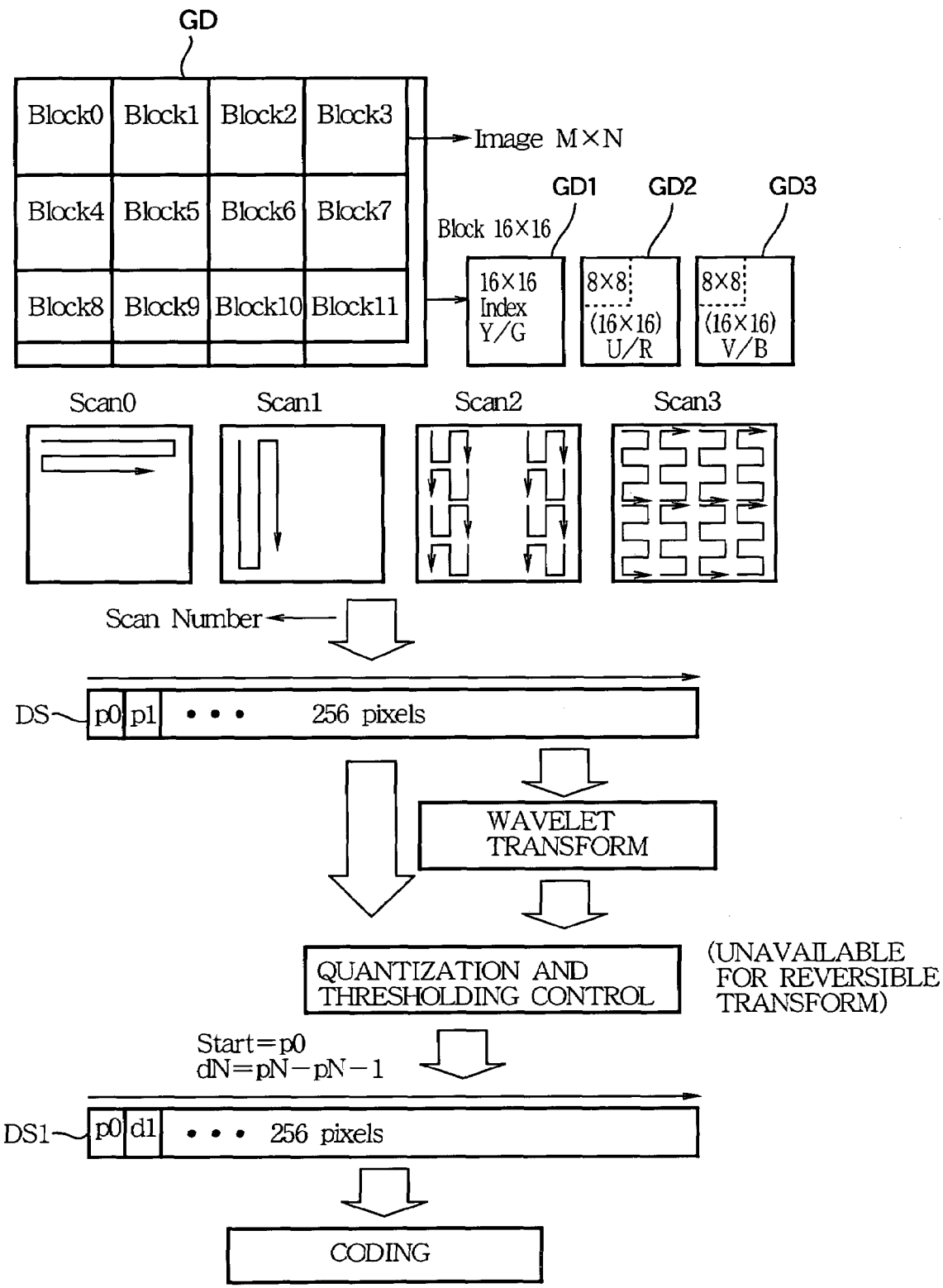
FIG. 1 is an explanatory diagram illustrating an image data compression method according to an embodiment of the present invention.
Figure 3:
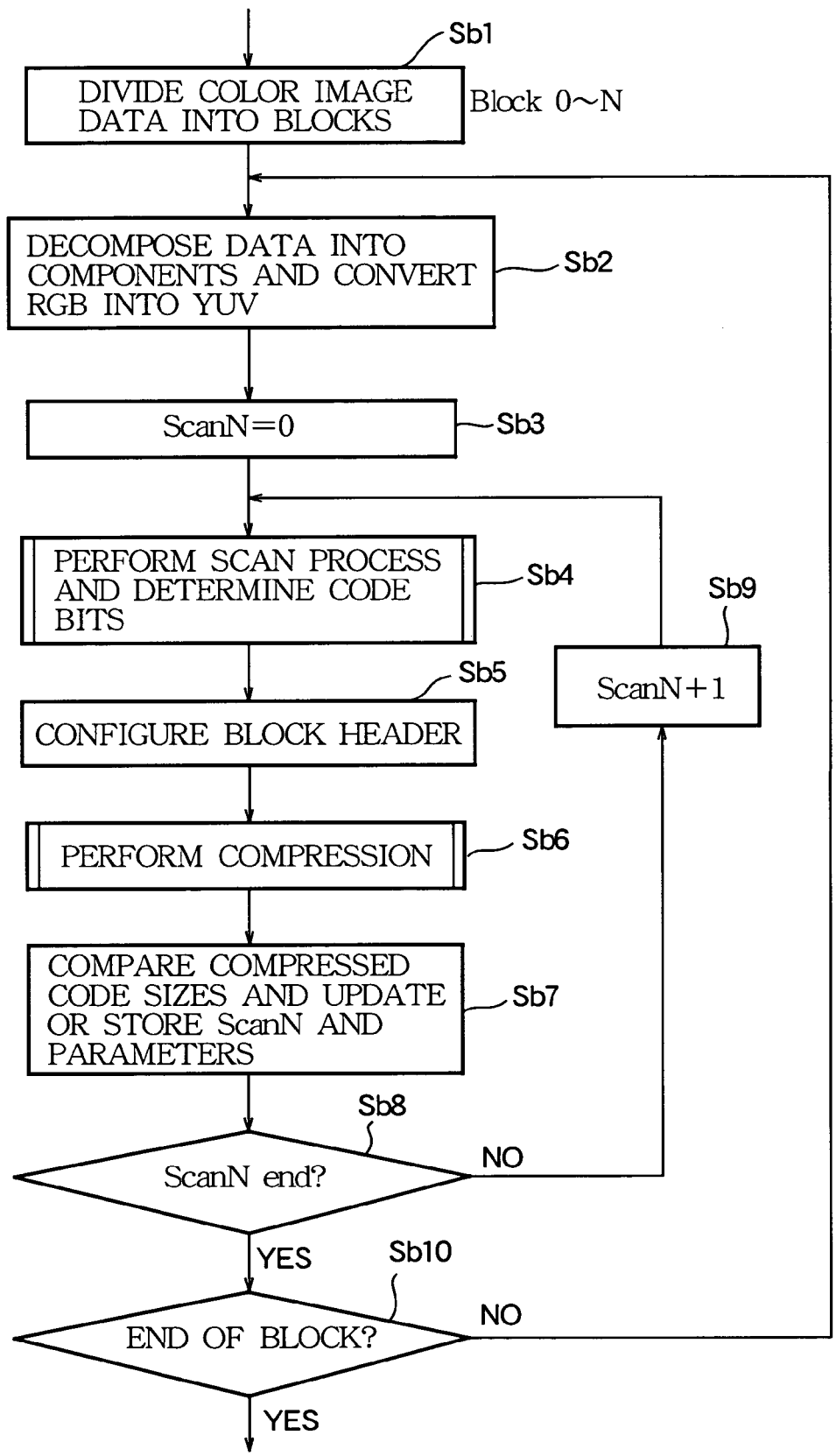
FIG. 3 is a flowchart showing the details of the compression process (step Sa8) in FIG. 2.

FIG. 1 is an explanatory diagram illustrating the compression process. FIG. 3 is a flowchart showing a flow of the compression process. The compression process first divides color image data into blocks (step Sb1). Let us assume that the reference symbol GD is image data corresponding to display dots on a display screen. This image data is divide into blocks of 16×16 dots. When the image data is RGB data, the RGB data is converted into YUV data according to the instruction. Further, the transformed U and V data are compressed by "skipping" (step Sb2).

When the image data is Index data, the above-mentioned process transforms each block data into 16×16 data corresponding to 16×16 dots (see the reference symbol GD1 in FIG. 1). When the image data is RGB data, each of R, G, and B data transforms into 16×16 data (see GD1 to GD3). When the image data is YUV data, the Y data transforms into 16×16 data (see GD1). Each of the U and V data transforms into 8×8 data (see GD2 and GD3). Each of the U and V data comprises 8×8 data as a result of the skipping.

The scan number is set to "0" (step Sb3). Control then advances to a scan process (step Sb4). The scan process arranges the blocked image data in a row. As shown in FIG. 1, there are predetermined four scan methods Scan0 to Scan3. Scan0 sequentially extracts data from the top left to the right of the 16×16 data. Upon completion of the data extraction on the top row, data is sequentially extracted from the right end to the left on the second row. On the third row, data is sequentially extracted from the left end again. Subsequently, this operation is repeated to create data stream DS of 256 data. In this manner, the data to be compressed is rearranged for the following reason. When an image comprises horizontal stripes, for example, arranging similar data can improve the compression efficiency.

Scan1 sequentially extracts data downward from the top left. Upon completion of the data extraction on the first column, data is sequentially extracted upward from the bottom on the second column. On the third column, data is sequentially extracted from the top again. Subsequently, this operation is repeated to create data stream DS of 256 data. Scan1 can improve the compression efficiency when an image comprises vertical stripes. Scan2 further segments blocks comprising 16×16 data and performs an extraction process similar to Scan1 for each block to create data stream DS. Likewise, Scan3 further segments blocks comprising 16×16 data and performs an extraction process similar to Scan0 for each block to create data stream DS. Scan2 and Scan3 can improve the compression efficiency when an image includes partially the same patterns or colors.

Scan methods are not limited to the above-mentioned four types. There may be various scan methods such as slantwise scanning, for example.

After the scan number is set to "0" at step Sb3 in FIG. 3, the process proceeds to step Sb4. The above-mentioned Scan0 is performed to create data stream DS.

Figure 4:
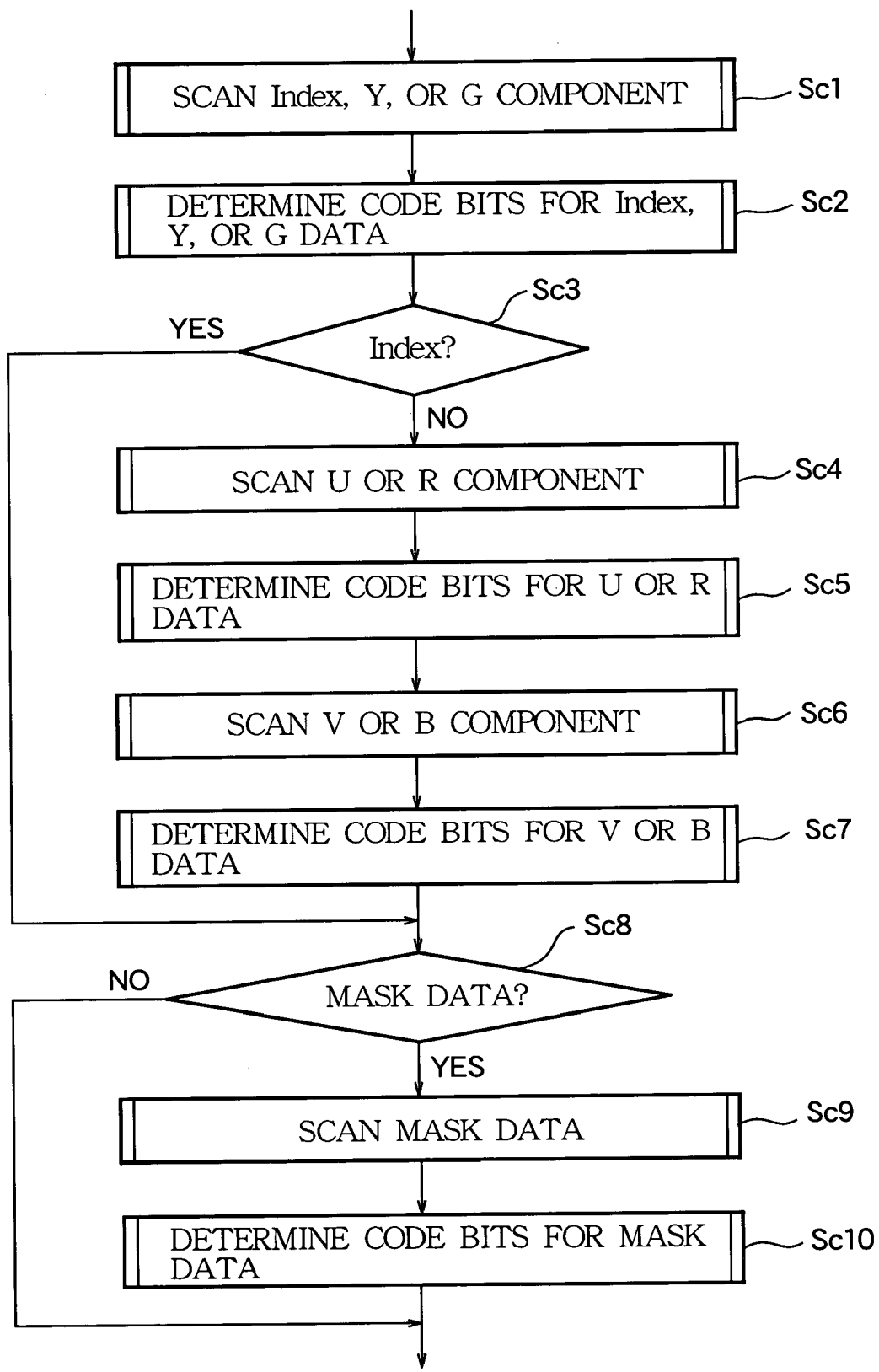
FIG. 4 is a flowchart showing the details of the scan process (step Sb4) in FIG. 3.

FIG. 4 is a flowchart showing the scan process (step Sb4) in detail. First, the process scans blocks of Index, Y, or G data (step Sc1) and creates data stream DS of code bits (step Sc2). The process determines whether or not the scanned data is Index data (step Sc3). If the result is "NO", the process advances to step Sc4 to scan blocks of U or R data (step Sc4). The process creates data stream comprising code bits (step Sc5). The process then scans blocks of V or B data (step Sc6) and creates data stream DS of code bits (step Sc7). If the result of step Sc3 is "YES", the process jumps to the next step by skipping the above-mentioned steps Sc4 through Sc7.

The process checks whether or not mask data is available (step Sc8). If mask data is available, the process scans blocks of mask data (step Sc9) and creates data stream DS of code bits (step Sc10). Then, control returns to the process in FIG. 3. If the result at step Sc8 is "No", control returns to the process in FIG. 3 by skipping the above-mentioned steps Sc9 and Sc10.

The process configures a block header at step Sb5 in FIG. 3, and then proceeds to the compression process at step Sb6.

The compression process will now be described with reference to FIGS. 5, 6, and 1.

Figure 5:
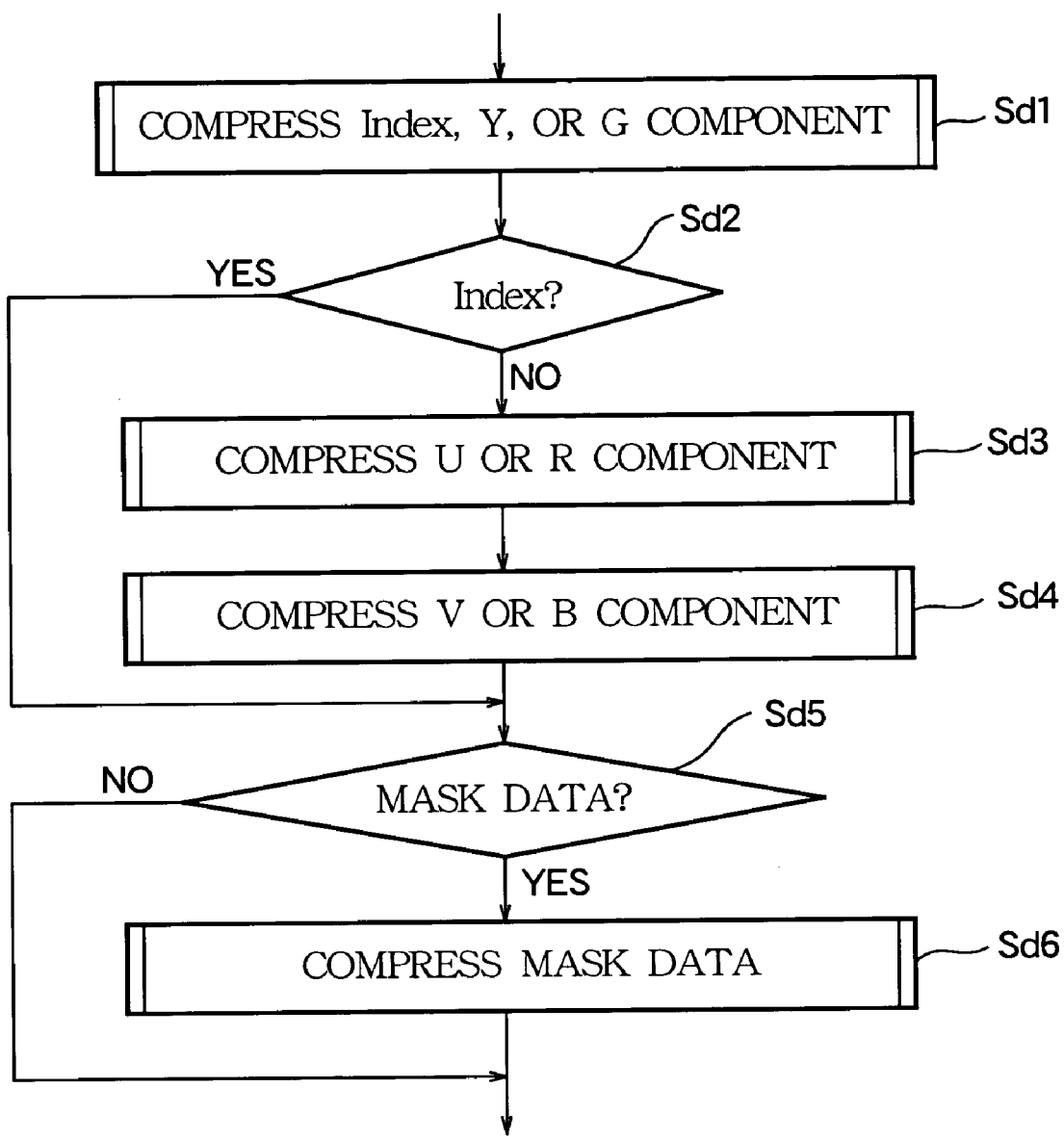
FIG. 5 is a flowchart showing the details of the compression process (step Sb6) in FIG. 3.

FIG. 5 is a flowchart showing the compression process. When control proceeds to this process, it compresses data stream DS based on the Index, Y, or G data (step Sd1). It is determined whether or not the compressed data is Index data (step Sd2). If the result is "NO", the process advances to step Sd3 and compresses data stream DS of U or R data (step Sd3). The process then compresses data stream DS of V or B data (step Sd4). If the result of step Sd2 is "YES", the process jumps to step Sd5 by skipping steps Sd3 and Sd4. It is determined whether or not there is available data stream DS of mask data at step Sd5. If data stream DS of mask data is available, the process compresses data stream DS of mask data (step Sd6) and then returns to the process in FIG. 3. If data stream DS of mask data is unavailable, the process skips step Sd6 and returns to the process in FIG. 3.

Figure 6:
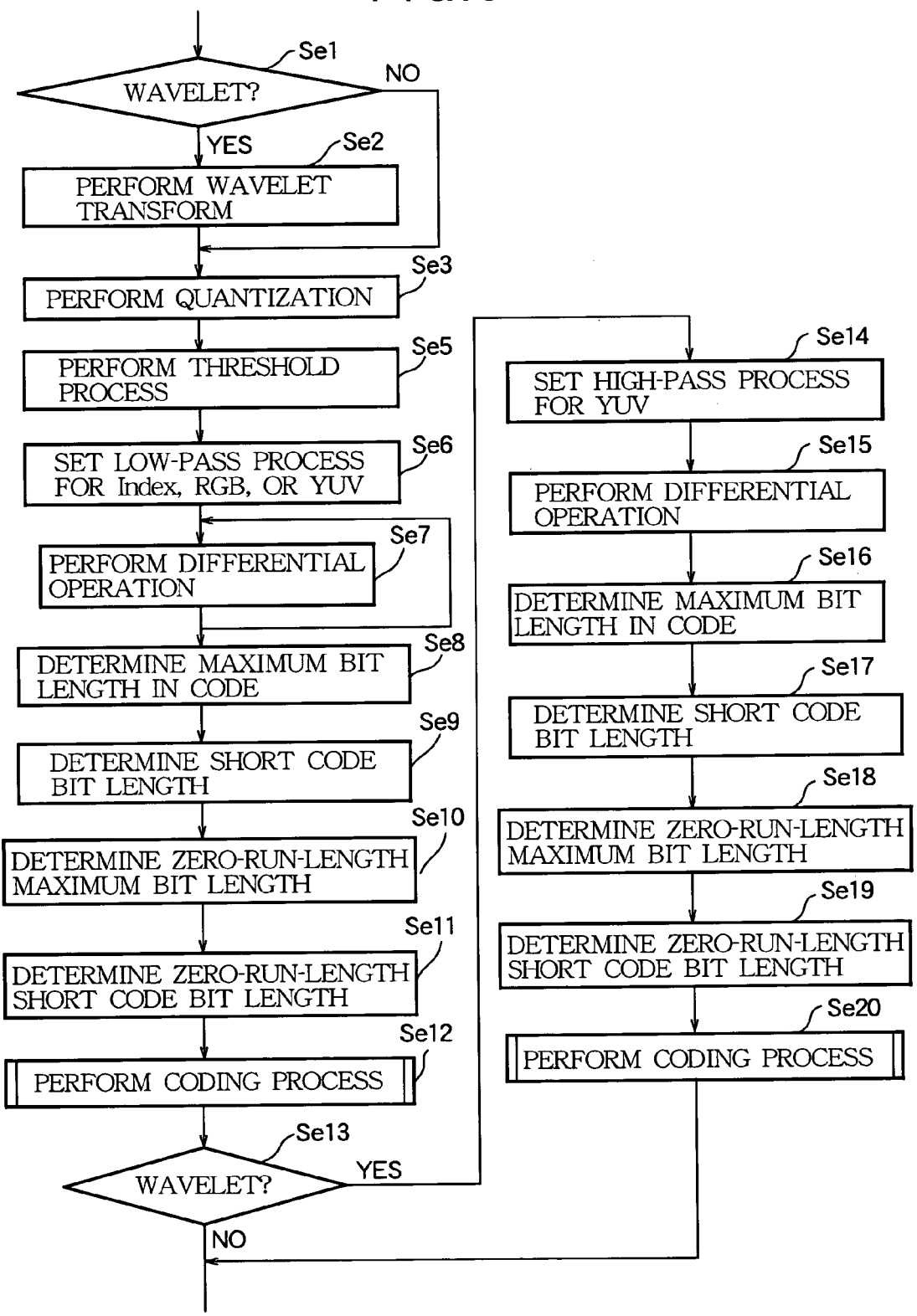
FIG. 6 is a flowchart showing the details of the compression process (steps Sd3, Sd4, and Sd6) in FIG. 5.

Referring now to a flowchart in FIG. 6 and FIG. 1, the following describes the compression process for data stream DS. The compression process first determines whether or not a wavelet transform process is performed (step Se1). If the result is "YES", the wavelet transform is performed (step Se2). If the result is "NO", the process proceeds to the next step by skipping step Se2. The wavelet transform provides irreversible transform with a high compression ratio. This embodiment can apply the wavelet transform to only YUV data according to a user specification.

Then, a quantization process is performed (step Se3). The quantization process divides each data in data stream DS by a specified value and degrades the accuracy by removing fractions below decimal point from a division result to decrease the number of bits. Then, a thresholding process is performed (step Se5). The thresholding process assumes value "0" when each data in data stream DS is less than or equal to a predetermined threshold value. When the threshold value is set to "1", for example, all the data less than or equal to "1" become "0s". After the wavelet transform, there are generated many data having small values. Performing the thresholding process produces many data set to "0s", improving the compression ratio for the subsequent processes. These two processes are irreversible transforms and therefore are not used for data suited to the reversible transform such as Index data.

Namely, the inventive hybrid compression method is designed for applying either of a reversible compression and an irreversible compression to image data in response to a compressing instruction by the user or else. The inventive method is carried out by a first process of dividing the image data into a plurality of blocks, a second process of linearly scanning the image data within the block by a given scan method defining a pattern of linearly scanning the image data of the block so as to arrange the image data in series, a third process of applying a wavelet transform to the image data obtained by the second process, a fourth process of performing quantization of the image data after the wavelet transform, a fifth process of performing differential operation of the image data after the quantization, and a sixth process of performing coding of the image data after the differential operation. The inventive hybrid compression method responds when the compressing instruction indicates the irreversible compression for applying the first process through sixth process to the same block so as to reduce an amount of the image data by the irreversible compression. Otherwise, the inventive hybrid method responds when the compressing instruction indicates the reversible compression for applying the first process, second process, fifth process and sixth process to the same block with skipping the third process and fourth process so as to reduce an amount of the image data by the reversible compression The process then configures various settings for the succeeding process (step Se6). The compression process in FIG. 6 can handle ten patterns of data types such as Index, R, G, B, Y (without wavelet), U (without wavelet), V (without wavelet), Y (with wavelet), U (with wavelet), and V (with wavelet). Each data pattern supports the following number of data items.

Index=R=G=B=Y (without wavelet)=256

U (without wavelet)=V (without wavelet)=64

Y (with wavelet)=128

U (with wavelet)=V (with wavelet)=32

If the number of data items differs, the next differential operation (step Se7) is subject to the different number of operations to calculate differences. It becomes necessary to predetermine the number of calculations. The other settings are needed. These settings are configured at step Se6. When the above-mentioned wavelet transform is performed at step Se2, there are obtained low-pass data and high-pass data. The process configures various settings for compressing low-pass data at step Se6.

At step Se7, the differential operation is performed to generate data stream DS1 (FIG. 1). That is to say, the differential operation transfers the first data in data stream DS (or the data stream after each of the above-mentioned processes) without change as the first data of data stream DS1. The differential operation writes the following difference data as the second and later data dN.

$$dN = p(N) - p(N-1)$$

For example, the second data d2 is obtained by subtracting the first data p(1) in data stream DS from the second data p(2) therein. Performing this differential operation can allow the same data to be generated from regularly increasing or decreasing data, improving the compression ration in the succeeding processes.

The process then checks each data in data stream DS1, detects data having a maximum bit length, and stores the bit length as "code_max" (step Se8). The process temporarily determines a short code bit length and stores the bit length as "code_th" (step Se9). The process checks data in data stream DS1 to detect the maximum number of "0s". The process stores the number of bits indicating the number of detected 0s as a zero-run-length maximum bit length "zero_max" (step Se10). The process then temporarily determines a zero-run-length short code bit length and stores it as "zero_th" (step Se11).

The process then performs a coding process using code_max, code_th, zero_max, and zero_th that are determined in the above-mentioned steps (step Se12). The process will be described below with reference to FIGS. 7 and 8.

The process detects a position in data stream DS1 that contains data "0" and then detects the number of "0" data (zero run length) at the detected positon. The process checks whether or not the number of 0s is less than or equal to zero_th. If the number of 0s is less than or equal to zero_th, the consecutive "0s" are represented with a format in FIG. 7(a) as follows.

0 0 Number of 0s (0RL)

Here, "0RL" denotes the zero run length. The number of bits to represent the number of 0s (0RL) indicates a numeral of zero_th. If the number of 0s exceeds zero_th (not including zero_th), the consecutive "0s" are represented with a format in FIG. 7(b) using two data items as follows.

0 0 0 . . . 0 (All "0s")
Number of 0s (0RL)

The number of bits for All "0s" indicates a numeral of zero_th. In this format, zero_max indicates the number of bits to represent the number of 0s.

For example, let us assume that zero_th is temporarily set to "2" and zero_max is set to "7". In this case, the following one data item represents data comprising three consecutive "0s" (zero run length "3").

0 0 1 1

The following data represents, e.g., zero run length "13".

0 0 0 0
0 0 0 1 1 0 1

The coding process using the above-mentioned formats is performed for all positions that contain data "0".

The process checks if each data except "0s" in data stream DS1 shows the same absolute value for the most recent data. If the data shows the same absolute value for the most recent data, the data is represented with a format in FIG. 7(c) as follows.

0 1 s

In this format, "s" becomes "0" when the target data is positive and has the same absolute value as that for the most recent data; it becomes "1" when the target data is negative and has the same absolute value as that for the most recent data.

With respect to data for which the coding process using the above-mentioned formats is not performed, it is determined whether or not the number of effective bits contained in the data is less than or equal to code_th. If the number of effective bits contained in the data is less than or equal to code_th, the data is represented with a format in FIG. (d) as follows.

1 0 data value

Here, the number of bits representing a data value corresponds to code_th. If the number of effective bits contained in the data exceeds code_th (not including code_th), the data is represented with a format in FIG. 7(e) as follows.

1 1 data value

Here, the number of bits representing a data value corresponds to code_max.

when code_th is set to "3" and code_max is set to "7", the target data "6" is represented with the following data.

1 0 1 1 0

The target data "15" is represented with the following data.

1 1 0 0 0 1 1 1 1

The coding process using the above-mentioned formats is performed for all data in data stream DS1 that are not coded in accordance with the formats in FIGS. 7(a) through (c).

Namely, the coding process performs the coding on the image data containing a continuous series of 0 data such that the continuous series of the 0 data is replaced by a combination of a first specific code of binary bits 00 indicating the continuous series of the 0 data and a number of the 0 data constituting the continuous series. More specifically, the coding process performs the coding on the image data containing a short continuous series of 0 data where a number of 0 data is not more than a reference zero run length and a long continuous series of 0 data where a number of 0 data is more than the reference zero run length, such that the short continuous series is replaced by a combination of the first specific code 00 indicating the short continuous series and the number 0RL of the 0 data denoted by a reduced bit length zero_th, and the long continuous series is replaced by a combination of the first specific code 00 with an additional code all0 discriminating the long continuous series from the short continuous series and the number 0RL of the 0 data denoted by a bit length zero_max longer than the reduced bit length zero_th. Further, the coding process performs the coding on the image data while changing the reference zero run length so as to detect an optimum reference zero run length, by which the amount of the image data is most reduced.

Further, the coding process performs the coding on the image data arranged in the series containing a preceding data and a succeeding data which is immediately after the preceding data and which has an absolute value identical to that of the preceding data, such that the succeeding data is replaced by a combination of a second specific code 01 of the binary bits indicating that the absolute value of the succeeding data is identical to that of the preceding data and a sign bit s indicating a sign of the succeeding data.

Moreover, the coding process performs the coding on the image data containing an insignificant data having a small value not more than a reference value and a significant data having a great value more than the reference value, such that the insignificant data is replaced by a combination of a third specific code 10 of the binary bits indicating the insignificant data and the small value thereof denoted by a reduced bit length code_th, and the significant data is replaced by a combination of a fourth specific code 11 indicating the significant data and the great value thereof denoted by a bit length code_max longer than the reduced bit length code_th. Further, the coding process performs the coding on the image data while changing the reference value so as to detect an optimum reference value, by which the amount of the image data is most reduced.

Figures 7, 8:
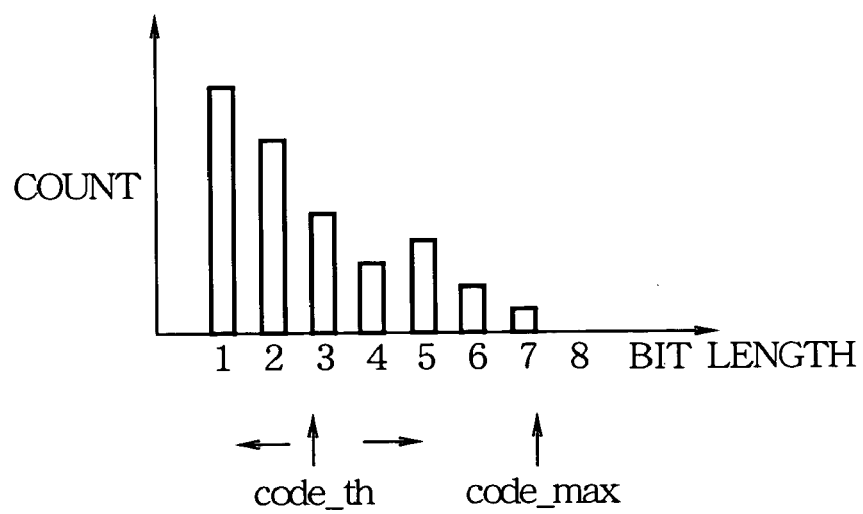
FIG. 7 shows formats used for the coding process (step Se12) in FIG. 6.
FIG. 8 diagrams the coding process (step Se12) in FIG. 6.

FIG. 8 exemplifies a graph showing the number of data items corresponding to the number of effective bits for each data except "0" in data stream DS1. When data is completed for the wavelet transform, the thresholding process, the differential operation, and the like, many of the data have small values, i.e., "1" or "2" attributed to the number of effective bits as shown in this graph. Accordingly, it is possible to improve the compression ratio by means of the coding process using the format in FIG. 7(d).

After the above-mentioned coding process is complete, it is repeated by diversely varying zero_th and code_th to determine zero_th and code_th that cause the smallest number of bits in data stream DS1 after coding.

When the coding process is complete (step Se12), control proceeds to step Se13 to determine whether or not the wavelet transform is performed at step Se2. If the result is "YES", control proceeds to step Se14. At step Se14, the settings similar to those at step Se6 are configured for high-pass data obtained by the wavelet transform. At steps Se15 through Se20, the high-pass data is compressed according to the similar process at steps Se7 through Se12.

The compression process has been described above. Upon completion of the compression process, the main process stores the parameters such as zero_th and code_th determined during the compression process, the scan method name, the data stream after the process, and the data stream size, i.e., the number of bits (step Sb7 in FIG. 3), and then proceeds to step Sb8 in FIG. 3. At step Sb8, it is determined whether or not the compression process is complete for any of the scan methods Scan0 through Scan3 (see FIG. 1). If the compression process is not complete for any of the scan methods, the process increments the scan number by "1" to return to step Sb4.

Thereafter, Scan1, namely, scan number "1", is performed at step Sb4. The above-mentioned compression process is performed for data stream DS after the scan (step Sb6). The process compares the number of bits after the compression by means of Scan1 with the number of bits after the compression by means of previous Scan0. The process stores the name of the scan method for the smaller number of bits, parameters, the data stream after the process, and the data stream size (step Sb7).

Thereafter, the same compression process is performed for the scan methods Scan2 and Scan3. The process stores the name of the scan method for the highest compression ratio at the end of the compression process according to Scan3, parameters, the data stream after the process, and the data stream size (step Sb7). The decision of step Sb8 becomes "YES". The process advances to step Sb10. At step Sb10, it is determined whether or not the compression process has terminated for all blocks. If the decision result is "NO", the process returns to step Sb2. The compression process is subsequently performed for the next block. When the compression process has terminated for all blocks, the decision result at step Sb10 becomes "YES" to finally terminate the compression process.

Namely, the inventive compression method is carried out by a first process of dividing the image data into a plurality of blocks, a second process of linearly scanning the image data within the block by a given scan method Scan defining a pattern of linearly scanning the image data of the block so as to arrange the image data in series, and a third process of compressing the arranged image data so as to reduce an amount of the image data of the block. The second process and the third process are repeatedly applied to the same block with using different scan methods Scan0 through Scan3 defining different patterns of linearly scanning the image data, then an optimum one of the different scan methods is selected, which succeeds in most reducing the amount of the image data, and the compressed image data arranged by the selected scan method is outputted together with indication of the selected scan method.

Figure 9:
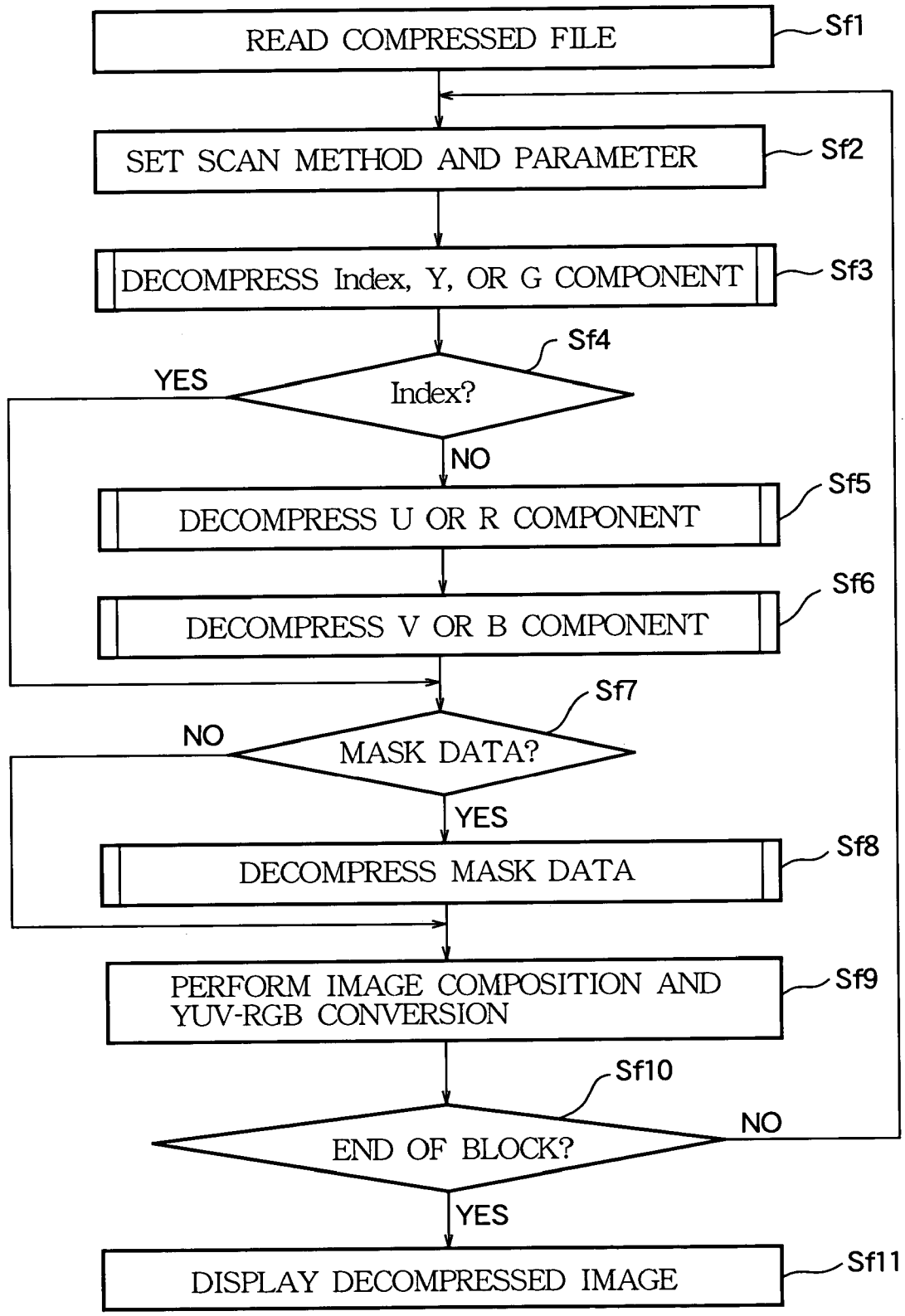
FIG. 9 is a flowchart showing a decompression process for decompressing data compressed with the compression method according to the embodiment in FIG. 1.
Figure 10:
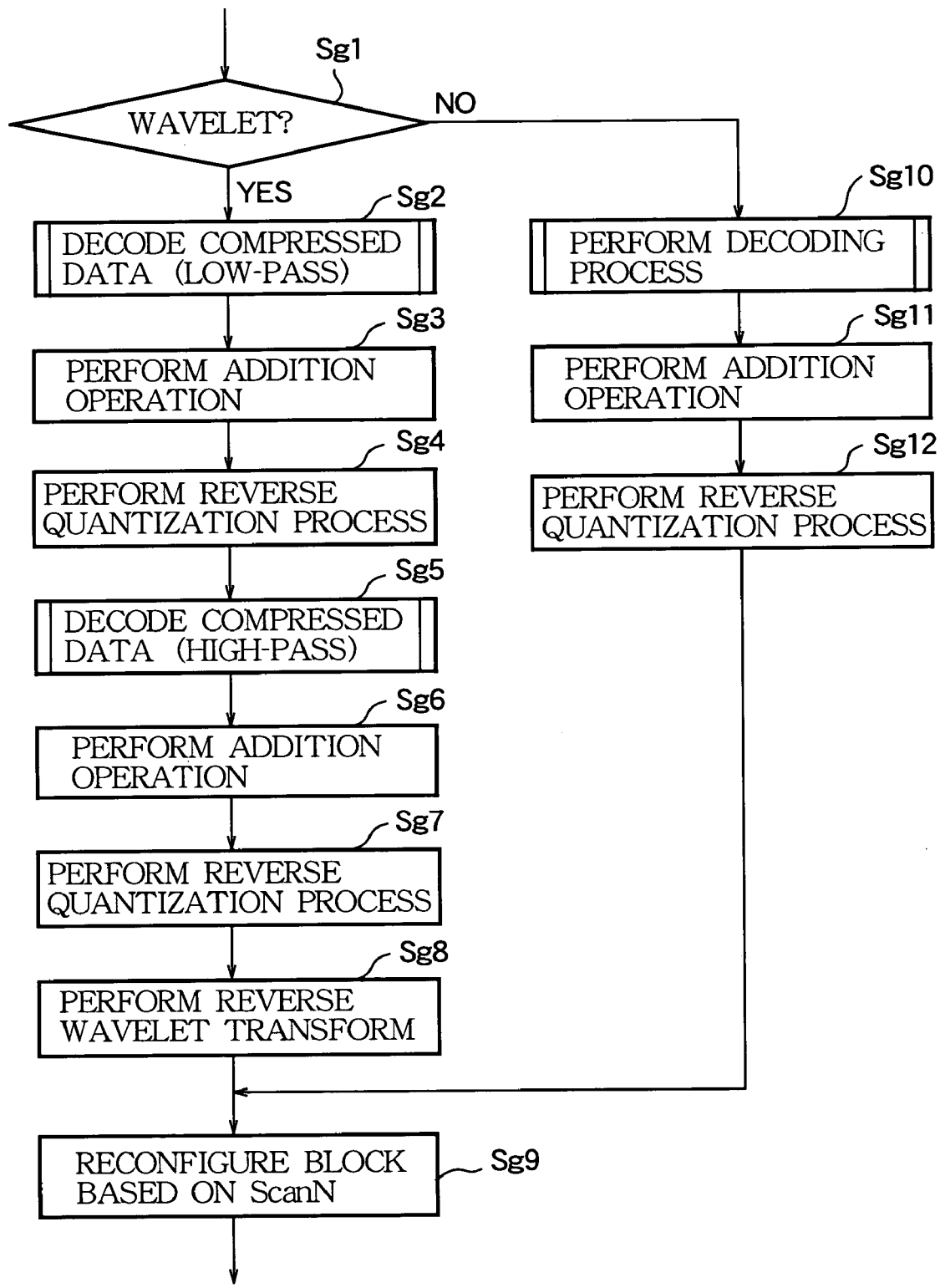
FIG. 10 is a flowchart showing the details of the decompression process (steps Sf3, Sf5, Sf6, and Sf8) in FIG. 9.
Figure 11:
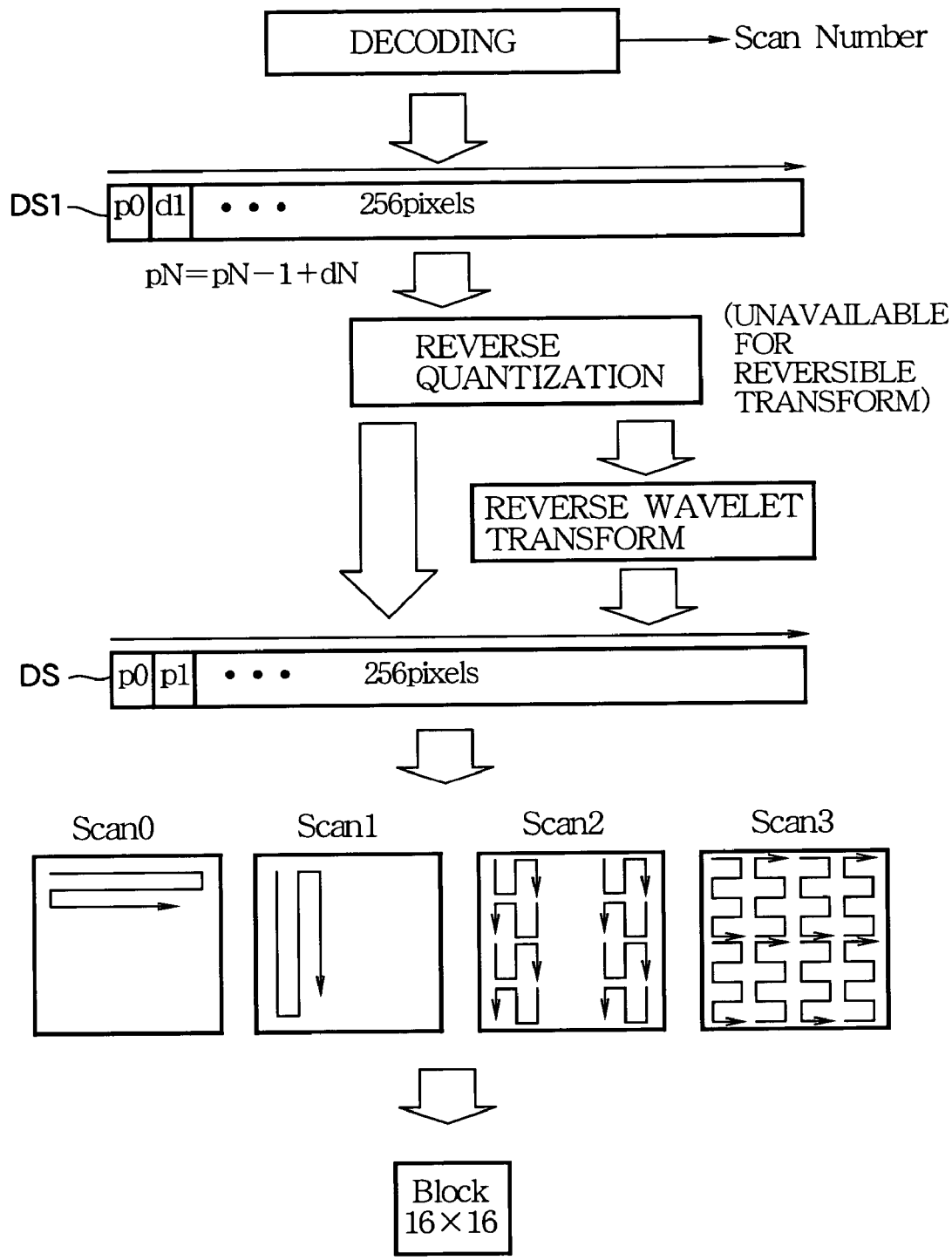
FIG. 11 is an explanatory diagram for illustrating the decompression process in FIG. 9.

Referring now to FIGS. 9 through 11, the following describes a decompression process of image data compressed by the above-mentioned compression process.

FIG. 9 is a flowchart showing the decompression process. The process first reads a compressed file (step Sf1). Here, the compressed file contains the compressed data stream, the scan method and parameters used for the compression on the basis of each block. The process provides a decompression circuit with a scan method and a parameter for the first block (step Sf2). The process decompresses the Index data (or Y or G data) for the first lock (step Sf3). It is determined whether or not the Index data is processed at step Sf3. If the Index data is not processed, the U data (or the R data) is decompressed. Then, the V data (or the B data) is decompressed (step Sf6). If the decision result at Sf4 is "YES", the process advances to step Sf7 by skipping steps Sf5 and Sf6.

At step Sf7, it is determined whether or not the block is attached with mask data. If the mask data is attached, it is decompressed (step Sf8). If no mask data is attached, the process advances to step Sf9 by skipping step Sf8. At step Sf9, the process performs the image composition based on the mask data and the YUV-RGB conversion (for YUV data). At step Sf10, it is determined whether or not the decompression process is complete for all blocks. If the decision result is "NO", the process returns to step Sf2 and decompresses compressed data for the next block subsequently. If the decision result is "YES" at step Sf10, the process displays an image using the decompressed image data (step Sf11).

The decompression process is described in detail with reference to FIGS. 10 and 11. FIG. 10 is a flowchart of the decompression process. FIG. 11 illustrates the decompression process.

In this decompression process, it is first determined whether or not the wavelet transform is performed for the compressed data (step Sg1). If the wavelet transform is performed, the low-pass data is first decoded. The decoding process is precisely reverse to the coding process (step Se12 in FIG. 6). The decoding process reproduces the above-mentioned data stream DS1 (see FIGS. 1 and 11).

Then, an addition operation is performed (step Sg3). The addition operation is reverse to the above-mentioned differential operation (step Se7 in FIG. 6) as follows.

$$pN = pN + dN$$

In this equation, dN: The Nth data in data stream DS1 pN: The Nth data in the data stream obtained as a result of the addition operation This operation returns data stream DS1 to the data stream before the differential operation. Then, a reverse quantization process is performed (step Sg4).

The process similar to steps Sg2 through Sg4 is performed for the high-pass data (steps Sg5 through Sg7). A reverse wavelet transform is performed on the basis of the low-pass data and high-pass data for which the above-mentioned processes are complete. The above-mentioned data stream DS (see FIGS. 1 and 11) is restored (step Sg8). The original block is reconfigured by rearranging the data in blocks reversely to the scan order indicated by the scan number used for the compression (step Sg9).

If it is determined that the wavelet transform is not used at step Sg1, the decoding process, the addition operation, and the reverse quantization process are performed at steps Sg10, Sg11, and Sg12. These processes are the same as those at steps Sg2 through Sg4. The blocks are reconfigured on the basis of the scan number (step Sg9).

Figure 12:
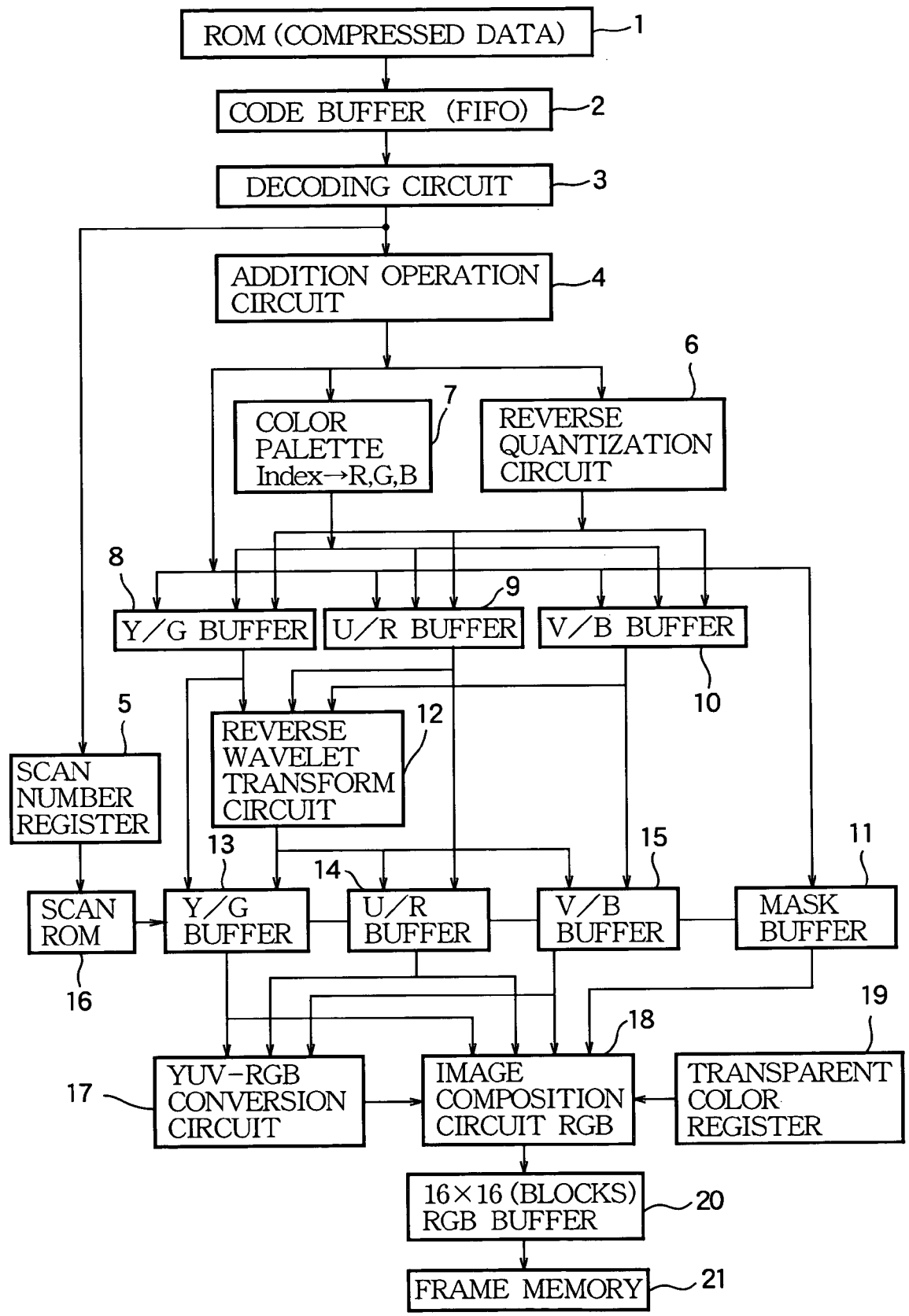
FIG. 12 is a block diagram showing a configuration of the image data decompression circuit according to the embodiment of the present invention.

The following describes the decompression circuit to perform the above-mentioned decompression process with reference to FIG. 12. In FIG. 12, the reference numeral 1 represents ROM (Read-Only Memory) that stores compressed data. The compressed data contains not only compressed image data, but also various parameters and the scan number used for the compression. The reference numeral 2 represents a FIFO (First-In First-Out) based code buffer that temporarily stores the compressed data read from the ROM 1. The reference numeral 3 represents a decoding circuit that decodes the compressed data read from the code buffer 2 (step Sg2 in FIG. 10). As a result, data stream DS1 is obtained. The decoding circuit 3 outputs this data stream DS1 to an addition operation circuit 4. Further, the decoding circuit 3 receives a scan number from the code buffer 2 and writes that scan number to a scan number register 5.

The addition operation circuit 4 applies the above-mentioned addition operation to data stream DS1 received from the decoding circuit 3 (step Sg3). If the data stream is Index data after the addition operation, the addition operation circuit 4 outputs the data stream to a color palette 7. If the data stream is not Index data and is reversible data, the addition operation circuit 4 writes the data stream to buffers 8 through 10. If the data stream is neither Index data nor reversible data, the addition operation circuit 4 outputs the data stream to a reverse quantization circuit 6. When the compressed data contains mask data, the addition operation circuit 4 writes the mask data after the addition operation to a buffer 11.

The reverse quantization circuit 6 applies a reverse quantization to the output from the addition operation circuit 4 and writes the result to the buffers 8 through 10. That is to say, when the compressed data is Y or G data, it is written to the buffer 8. When the compressed data is U or R data, it is written to the buffer 9. When the compressed data is V or B data, it is written to the buffer 10.

The color palette 7 transforms the Index data output from the addition operation circuit 4 into RGB data and writes it to the buffers 8 through 10. When the buffers 8 through 10 contain wavelet-transformed low-pass data, a reverse wavelet transform circuit 12 temporarily stores the data internally. When high-pass data is written to the buffers 8 through 10, the reverse wavelet transform circuit 12 performs a reverse wavelet transform based on the low-pass and high-pass data and outputs the transformed data. In this case, data in the buffer 8 is passed through the reverse wavelet transform and is output to the buffer 13. Data in the buffer 9 is passed through the reverse wavelet transform and is output to the buffer 14. Data in the buffer 10 is passed through the reverse wavelet transform and is output to the buffer 15.

A scan ROM 16 previously stores sequences of writing data corresponding to the scan numbers 0 through 3. When data in the scan number register 5 specifies write sequences, the scan ROM 16 outputs the write sequences to the corresponding buffers 13 through 15 and 11. The data output to the buffers 13 through 15 from the reverse wavelet transform circuit 12 is written to the buffers 13 through 15 in a sequence that resumes the scan based on the scan number. The same applies to data that is not passed through the reverse wavelet transform. When the data is transferred to the buffers 13 through 15 from the buffers 8 through 10, the data is written in a sequence that resumes the scan. Data is written to the buffer 11 in the same manner.

When the buffers 13 through 15 contain Y, U, and V data, a YUV-RGB conversion circuit 17 converts the data into R, G, and B data using a specified operation and outputs the data to an image composition circuit 18. When the YUV-RGB conversion circuit 17 outputs RGB data, the image composition circuit 18 replaces transparent color data indicated by the mask data output from the buffer 11 with a color code in a transparent register 19 that stores the transparent color code. The color code is written to a frame memory via an RGB buffer 20 comprising 16×16 words. Likewise, when the buffers 13 through 15 contain RGB data, the image composition circuit 18 replaces the RGB data specified by the mask data in the buffer 11 with the transparent color code. The color code is written to the frame memory 21 via the RGB buffer 20.

As mentioned above, the present invention can highly efficiently compress image data and can fast decompress the compressed data with simple processing without the need for tables or complicated operations. Furthermore, the present invention is capable of both lossless compression of indexed image data and lossy compression or highly efficient compression of RGB-format or YUV-format image data.

What is claimed is:

1. A method of compressing image data comprising:
   a first process of dividing the image data into a plurality of blocks;
   a second process of linearly scanning the image data within the block by a given scan method defining a pattern of linearly scanning the image data of the block so as to arrange the image data in series; and
   a third process of compressing the arranged image data so as to reduce an amount of the image data of the block, wherein
   the second process and the third process are repeatedly applied to the same block using different scan methods defining different patterns of linearly scanning the image data, then an optimum one of the different scan methods is selected, which succeeds in most reducing the amount of the image data, and the compressed image data arranged by the selected scan method is outputted together with indication of the selected scan method.

2. The method according to claim 1, further comprising a conversion process performed between the first process and the second process for converting a format of the image data from an initial RGB format to a YUV format suitable for the compressing performed by the third process.

3. The method according to claim 1, wherein the third process includes a wavelet transform process for applying a wavelet transform to the image data arranged in series.

4. The method according to claim 3, wherein the third process further includes a quantizing process for performing quantization of the image data after the wavelet transform, a differential process for performing differential operation of the image data after the quantization, and a coding process for performing coding of the image data after the differential operation.

5. A method of applying either of a reversible compression and an irreversible compression to image data in response to a compressing instruction, the method comprising:
- a first process of dividing the image data into a plurality of blocks;
- a second process of linearly scanning the image data within the block by a given scan method defining a pattern of linearly scanning the image data of the block so as to arrange the image data in series;
- a third process of applying a wavelet transform to the image data obtained by the second process;
- a fourth process of performing quantization of the image data after the wavelet transform;
- a fifth process of performing differential operation of the image data after the quantization; and
- a sixth process of performing coding of the image data after the differential operation, wherein
- the method responds when the compressing instruction indicates the irreversible compression for repeatedly applying the first process through sixth process to the same block so as to reduce an amount of the image data by the irreversible compression while using different scan methods defining different patterns of linearly scanning the image data, then selecting an optimum one of the different scan methods, which succeeds in most reducing the amount of the image data, and outputting the irreversibly compressed image data after arrangement by the selected scan method together with indication of the selected scan method, and wherein
- the method responds when the compressing instruction indicates the reversible compression for repeatedly applying the first process, second process, fifth process and sixth process to the same block with skipping the third process and fourth process so as to reduce an amount of the image data by the reversible compression while using different scan methods defining different patterns of linearly scanning the image data, then selecting an optimum one of the different scan methods, which succeeds in most reducing the amount of the image data, and outputting the reversibly compressed image data after arrangement by the selected scan method together with indication of the selected scan method.

6. The method according to claim 5, further comprising a conversion process performed between the first process and the second process for converting a format of the image data from an initial RGB format to a YUV format suitable for the wavelet transform.

7. The method according to claim 5, further comprising a threshold process performed between the fourth process and the fifth process for thresholding the image data representing a plurality of numerical values so as to replace each numerical value less than a predetermined threshold value by the 0 value.

8. The method according to claim 5, further comprising a process of creating mask data which defines a mask pattern corresponding to a portion of the image data requiring the reversible compression, wherein the method applies the first process, second process, fifth process and sixth process to the mask data so as to reduce an amount of the mask data by the reversible compression, and outputs the reversibly compressed mask data together with the compressed image data.

9. The method according to claim 5, wherein the sixth process performs the coding on the image data containing a continuous series of 0 data such that the continuous senes of the 0 data is replaced by a combination of a first specific code indicating the continuous series of the 0 data and a number of the 0 data constituting the continuous series.

10. The method according to claim 5, wherein the sixth process performs the coding on the image data containing a short continuous series of 0 data where a number of 0 data is not more than a reference zero run length and a long continuous series of 0 data where a number of 0 data is more than the reference zero run length, such that the short continuous series is replaced by a combination of a first specific code indicating the short continuous series and the number of the 0 data thereof denoted by a reduced bit length, and the long continuous series is replaced by a combination of the first specific code with an additional code discriminating the long continuous series from the short continuous series and the number of the 0 data thereof denoted by a bit length longer than the reduced bit length.

11. The method according to claim 10, wherein the sixth process performs the coding on the image data while changing the reference zero run length so as to detect an optimum reference zero run length, by which the amount of the image data is most reduced.

12. The method according to claim 5, wherein the sixth process performs the coding on the image data arranged in the series containing a preceding data and a succeeding data which is immediately after the preceding data and which has an absolute value identical to that of the preceding data, such that the succeeding data is replaced by a combination of a second specific code indicating that the absolute value of the succeeding data is identical to that of the preceding data and a sign bit indicating a sign of the succeeding data.

13. The method according to claim 5, wherein the sixth process performs the coding on the image data containing an insignificant data having a small value not more than a reference value and a significant data having a great value more than the reference value, such that the insignificant data is replaced by a combination of a third specific code indicating the insignificant data and the small value thereof denoted by a reduced bit length, and the significant data is replaced by a combination of a fourth specific code indicating the significant data and the great value thereof denoted by a bit length longer than the reduced bit length.

14. The method according to claim 13, wherein the sixth process performs the coding on the image data while changing the reference value so as to detect an optimum reference value, by which the amount of the image data is most reduced.

15. A decompression apparatus for decompressing image data which is provided in a compressed form together with indication of a scan method applied to the image data, which is compressed by a dividing process of dividing the image data into a plurality of blocks, a scanning process of linearly scanning the image data within the block by a given scan method defining a pattern of linearly scanning the image data of the block so as to arrange the image data in series, and a compressing process of compressing the arranged image data so as to reduce an amount of the image data of the block, wherein the scanning process and the compressing process are repeatedly applied to the same block with using different scan methods defining different patterns of linearly scanning the image data, then an optimum one of the different scan methods is selected, which succeeds in most reducing the amount of the image data, and the compressed image data arranged by the selected scan method is provided together with indication of the selected scan method, the apparatus comprising:
- a decompressing section that decompresses the image data by reversely performing the compressing process;

a rearranging section that rearranges the series of the decompressed image data by an order reverse to that defined by the selected scanning method so as to restore each of the blocks; and a storing section that collectively stores the restored blocks of the image data.

16. The decompression apparatus according to claim 15, wherein the compression process includes a quantizing process for performing quantization of the image data, and wherein the decompressing section decompresses the image data by reversely performing the quantizing process on the image data.

17. The decompression apparatus according to claim 16, wherein the compression process further includes a wavelet transform process for applying a wavelet transform to the image data, and wherein the decompressing section decompresses the image data by reversely performing the wavelet transform on the image data.

18. A decompression apparatus for decompressing image data which is provided in a compressed form together with indication of a scan method and a compressing instruction applied to the image data, which has been compressed by a compression method including a dividing process of dividing the image data into a plurality of blocks, a scanning process of linearly scanning the image data within the block by a given scan method defining a pattern of linearly scanning the image data of the block so as to arrange the image data in series, a transform process of applying a wavelet transform to the image data obtained by the scanning process, a quantizing process of performing quantization of the image data after the wavelet transform, a differential process of performing differential operation of the image data after the quantization, and a coding process of performing coding of the image data after the differential operation, wherein the compression method responds when the compressing instruction indicates an irreversible compression for repeatedly applying the dividing process, scanning process, transform process, quantizing process, differential process and coding process to the same block so as to reduce an amount of the image data by the irreversible compression while using different scan methods defining different patterns of linearly scanning the image data, then selecting an optimum one of the different scan methods, which succeeds in most reducing the amount of the image data, and outputting the irreversibly compressed image data after arrangement by the selected scan method together with indication of the selected scan method, and wherein the compression method responds when the compressing instruction indicates a reversible compression for repeatedly applying the dividing process, scanning process, differential process and coding process to the same block with skipping the transform process and quantizing process so as to reduce an amount of the image data by the reversible compression while using different scan methods defining different patterns of linearly scanning the image data, then selecting an optimum one of the different scan methods, which succeeds in most reducing the amount of the image data, and outputting the reversibly compressed image data after arrangement by the selected scan method together with indication of the selected scan method, the decompression apparatus comprising:

a first decoding section that decodes the image data by reversely performing the coding applied to the compressed image data;

an adding section that performs an adding operation on the decoded image data to remove the differential operation applied to the image data;

a second decoding section, being operative when the compressing instruction indicates that the image data has been irreversibly compressed, for performing a reverse quantization and a reverse wavelet transform to the image data fed from the adding section so as to decompress the image data, and being operative when the compressing instruction indicates that the image data has been reversibly compressed, for applying no operation to the image data fed from the adding section;

a rearranging section that rearranges the series of the image data fed from the second decoding section by an order reverse to that defined by the selected scanning method so as to restore each of the blocks; and a storing section that stores each of the restored blocks to thereby obtain an expanded form of the compressed image data.

19. The decompression apparatus according to claim 18, wherein the compression method further comprises a conversion process performed between the dividing process and the scanning process for converting a format of the image data from an initial RGB format to a YUV format suitable for the wavelet transform, the decompression apparatus further comprising a converting section that converts back the YUV format of the image data fed from the second decoding section into the initial RGB format, and that provides the image data of the RGB format to the storing section.

20. The decompression apparatus according to claim 18, wherein the coding process has performed the coding on the image data containing a continuous series of 0 data such that the continuous series of the 0 data has been replaced by a combination of a first specific code indicating the continuous series of the 0 data and an additional data indicating a number of the 0 data constituting the continuous series, and wherein the first decoding section operates when the first specific code is detected in the compressed image data for restoring the continuous series of the 0 data having the number of the 0 data indicated by the additional data.

21. The decompression apparatus according to claim 18, wherein the coding process has performed the coding on the image data containing a short continuous series of 0 data where a number of 0 data is not more than a reference zero run length and a long continuous series of 0 data where a number of 0 data is more than the reference zero run length, such that the short continuous series has been replaced by a combination of a first specific code indicating the short continuous series and an additional data denoting the number of the 0 data by a reduced bit length, and the long continuous series has been replaced by a combination of the first specific code with an additional code discriminating the long continuous series from the short continuous series and an additional data denoting the number of the 0 data by a bit length longer than the reduced bit length, and wherein the first decoding section operates when the first specific code is detected in the compressed image data for restoring the short continuous series of the 0 data having the number of the 0 data indicated by the additional data, and the first decoding section operates when the first specific code attached with the additional code is detected in the compressed image data for restoring the long continuous series of the 0 data having the number of the 0 data indicated by the additional data.

22. The decompression apparatus according to claim 18, wherein the coding process has performed the coding on the image data arranged in the series containing a preceding data and a succeeding data which is immediately after the preceding data and which has an absolute value identical to that of the preceding data, such that the succeeding data is replaced by a combination of a second specific code indicating that the absolute value of the succeeding data is identical to that of the preceding data and a sign bit indicating a sign of the succeeding data, and wherein the first decoding section operates when the second specific code is detected together with the sign bit after the preceding data in the compressed image data for restoring the succeeding data having the absolute value identical to that of the preceding data and having the sign indicated by the sign bit.

23. The decompression apparatus according to claim 18, wherein the coding process has performed the coding on the image data containing an insignificant data having a small value not more than a reference value and a significant data having a great value more than the reference value, such that the insignificant data is replaced by a combination of a third specific code indicating the insignificant data and an additional data denoting the small value thereof by a reduced bit length, and the significant data is replaced by a combination of a fourth specific code indicating the significant data and an additional data denoting the great value thereof by a bit length longer than the reduced bit length, and wherein the first decoding section operates when the third specific code is detected together with the additional data for restoring the insignificant data having the small value denoted by the additional data, and the first decoding section operates when the fourth specific code is detected together with the additional data for restoring the significant data having the great value denoted by the additional data.

24. A decompression program recorded on a computer readable medium and executable in a decompression apparatus for decompressing image data which is provided in a compressed form together with indication of a scan method applied to the image data, which has been compressed by a dividing process of dividing the image data into a plurality of blocks, a scanning process of linearly scanning the image data within the block by a given scan method defining a pattern of linearly scanning the image data of the block so as to arrange the image data in series, and a compressing process of compressing the arranged image data so as to reduce an amount of the image data of the block, wherein the scanning process and the compressing process are repeatedly applied to the same block with using different scan methods defining different patterns of linearly scanning the image data, then an optimum one of the different scan methods is selected, which succeeds in most reducing the amount of the image data, and the compressed image data arranged by the selected scan method is provided together with indication of the selected scan method, the decompression program being executed to perform a decompression method comprising:

a decompressing process for decompressing the image data by reversely performing the compressing process;

a rearranging process for rearranging the series of the decompressed image data by an order reverse to that defined by the selected scanning method so as to restore each of the blocks; and a storing process for collectively storing the restored blocks of the image data.

25. The decompression program according to claim 24, wherein the compression process includes a quantizing process for performing quantization of the image data, and wherein the decompressing process decompresses the image data by reversely performing the quantizing process on the image data.

26. The decompression program according to claim 25, wherein the compression process further includes a wavelet transform process for applying a wavelet transform to the image data, and wherein the decompressing process decompresses the image data by reversely performing the wavelet transform on the image data.

27. A decompression program recorded on a computer readable medium and executable in a decompression apparatus for decompressing image data which is provided in a compressed form together with indication of a scan method and a compressing instruction applied to the image data, which has been compressed by a compression method including a dividing process of dividing the image data into a plurality of blocks, a scanning process of linearly scanning the image data within the block by a given scan method defining a pattern of linearly scanning the image data of the block so as to arrange the image data in series, a transform process of applying a wavelet transform to the image data obtained by the scanning process, a quantizing process of performing quantization of the image data after the wavelet transform, a differential process of performing differential operation of the image data after the quantization, and a coding process of performing coding of the image data after the differential operation, wherein the compression method responds when the compressing instruction indicates an irreversible compression for repeatedly applying the dividing process, scanning process, transform process, quantizing process, differential process and coding process to the same block so as to reduce an amount of the image data by the irreversible compression while using different scan methods defining different patterns of linearly scanning the image data, then selecting an optimum one of the different scan methods, which succeeds in most reducing the amount of the image data, and outputting the irreversibly compressed image data after arrangement by the selected scan method together with indication of the selected scan method, and wherein the compression method responds when the compressing instruction indicates a reversible compression for repeatedly applying the dividing process, scanning process, differential process and coding process to the same block with skipping the transform process and quantizing process so as to reduce an amount of the image data by the reversible compression while using different scan methods defining different patterns of linearly scanning the image data, then selecting an optimum one of the different scan methods, which succeeds in most reducing the amount of the image data, and outputting the reversibly compressed image data after arrangement by the selected scan method together with indication of the selected scan method, the decompression program being executable to perform a decompression method comprising:

a first decoding process for decoding the image data by reversely performing the coding applied to the compressed image data;

an adding process for performing adding operation of the decoded image data to remove the differential operation applied to the image data;

a second decoding process being commenced when the compressing instruction indicates that the image data has been irreversibly compressed for performing a reverse quantization and a reverse wavelet transform to the image data fed from the adding process so as to decompress the image data, and being commenced when the compressing instruction indicates that the image data has been reversibly compressed for applying no operation to the image data fed from the adding process;

a rearranging process for rearranging the series of the image data fed from the second decoding process by an order reverse to that defined by the selected scanning method so as to restore each of the blocks; and a storing process for storing each of the restored blocks to thereby obtain an expanded form of the compressed image data.

28. The decompression program according to claim 27, wherein the compression method further comprises a conversion process performed between the dividing process and the scanning process for converting a format of the image data from an initial RGB format to a YUV format suitable for the wavelet transform, and wherein the decompression method further comprises a converting process for converting back the YUV format of the image data fed from the second decoding process into the initial RGB format, and for providing the image data of the RGB format to the storing process.

29. The decompression program according to claim 27, wherein the coding process has performed the coding on the image data containing a continuous series of 0 data such that the continuous series of the 0 data has been replaced by a combination of a first specific code indicating the continuous series of the 0 data and an additional data indicating a number of the 0 data constituting the continuous series, and wherein the first decoding process is performed when the first specific code is detected in the compressed image data for restoring the continuous series of the 0 data having the number of the 0 data indicated by the additional data.

30. The decompression program according to claim 27, wherein the coding process has performed the coding on the image data containing a short continuous series of 0 data where a number of 0 data is not more than a reference zero run length and a long continuous series of 0 data where a number of 0 data is more than the reference zero run length, such that the short continuous series has been replaced by a combination of a first specific code indicating the short continuous series and an additional data denoting the number of the 0 data by a reduced bit length, and the long continuous series has been replaced by a combination of the first specific code with an additional code discriminating the long continuous series from the short continuous series and an additional data denoting the number of the 0 data by a bit length longer than the reduced bit length, and wherein the first decoding process is performed when the first specific code is detected in the compressed image data for restoring the short continuous series of the 0 data having the number of the 0 data indicated by the additional data, and the first decoding process is performed when the first specific code attached with the additional code is detected in the compressed image data for restoring the long continuous series of the 0 data having the number of the 0 data indicated by the additional data.

31. The decompression program according to claim 27, wherein the coding process has performed the coding on the image data arranged in the series containing a preceding data and a succeeding data which is immediately after the preceding data and which has an absolute value identical to that of the preceding data, such that the succeeding data is replaced by a combination of a second specific code indicating that the absolute value of the succeeding data is identical to that of the preceding data and a sign bit indicating a sign of the succeeding data, and wherein the first decoding process is performed when the second specific code is detected together with the sign bit after the preceding data in the compressed image data for restoring the succeeding data having the absolute value identical to that of the preceding data and having the sign indicated by the sign bit.

32. The decompression program according to claim 27, wherein the coding process has performed the coding on the image data containing an insignificant data having a small value not more than a reference value and a significant data having a great value more than the reference value, such that the insignificant data is replaced by a combination of a third specific code indicating the insignificant data and an additional data denoting the small value thereof by a reduced bit length, and the significant data is replaced by a combination of a fourth specific code indicating the significant data and an additional data denoting the great value thereof by a bit length longer than the reduced bit length, and wherein the first decoding process is performed when the third specific code is detected together with the additional data for restoring the insignificant data having the small value denoted by the additional data, and the first decoding process is performed when the fourth specific code is detected together with the additional data for restoring the significant data having the great value denoted by the additional data.

33. A decompression method for decompressing image data which is provided in a compressed form together with indication of a scan method applied to the image data, which has been compressed by a dividing process of dividing the image data into a plurality of blocks, a scanning process of linearly scanning the image data within the block by a given scan. method defining a pattern of linearly scanning the image data of the block so as to arrange the image data in series, and a compressing process of compressing the arranged image data so as to reduce an amount of the image data of the block, wherein the scanning process and the compressing process are repeatedly applied to the same block with using different scan methods defining different patterns of linearly scanning the image data, then an optimum one of the different scan methods is selected, which succeeds in most reducing the amount of the image data, and the compressed image data arranged by the selected scan method is provided together with indication of the selected scan method, the decompression method comprising:

a decompressing process for decompressing the image data by reversely performing the compressing process;

a rearranging process for rearranging the series of the decompressed image data by an order reverse to that defined by the selected scanning method so as to restore each of the blocks; and a storing process for collectively storing the restored blocks of the image data.

34. A decompression method for decompressing image data which is provided in a compressed form together with indication of a scan method and a compressing instruction applied to the image data, which has been compressed by a compression method including a dividing process of dividing the image data into a plurality of blocks, a scanning process of linearly scanning the image data within the block by a given scan method defining a pattern of linearly scanning the image data of the block so as to arrange the image data in series, a transform process of applying a wavelet transform to the image data obtained by the scanning process, a quantizing process of performing quantization of the image data after the wavelet transform, a differential process of performing differential operation of the image data after the quantization, and a coding process of performing coding of the image data after the differential operation, wherein the compression method responds when the compressing instruction indicates an irreversible compression for repeatedly applying the dividing process, scanning process, transform process, quantizing process, differential process and coding process to the same block so as to reduce an amount of the image data by the irreversible compression while using different scan methods defining different patterns of linearly scanning the image data, then selecting an optimum one of the different scan methods, which succeeds in most reducing the amount of the image data, and outputting the irreversibly compressed image data after arrangement by the selected scan method together with indication of the selected scan method, and wherein the compression method responds when the compressing instruction indicates a reversible compression for repeatedly applying the dividing process, scanning process, differential process and coding process to the same block with skipping the transform process and quantizing process so as to reduce an amount of the image data by the reversible compression while using different scan methods defining different patterns of linearly scanning the image data, then selecting an optimum one of the different scan methods, which succeeds in most reducing the amount of the image data, and outputting the reversibly compressed image data after arrangement by the selected scan method together with indication of the selected scan method, the decompression method comprising:

a first decoding process for decoding the image data by reversely performing the coding applied to the compressed image data;

an adding process for performing adding operation of the decoded image data to remove the differential operation applied to the image data;

a second decoding process being commenced when the compressing instruction indicates that the image data has been irreversibly compressed for performing a reverse quantization and a reverse wavelet transform to the image data fed from the adding process so as to decompress the image data, and being commenced when the compressing instruction indicates that the image data has been reversibly compressed for applying no operation to the image data fed from the adding process;

a rearranging process for rearranging the series of the image data fed from the second decoding process by an order reverse to that defined by the selected scanning method so as to restore each of the blocks; and a storing process for storing each of the restored blocks to thereby obtain an expanded form of the compressed image data.

35. A method of compressing image data representing dots of an image, comprising:

a first process of dividing the image data into a plurality of blocks, so that each block represents n×m dots arranged in rows and columns;

a second process of linearly scanning the image data within the block by a given scan method defining a pattern of linearly scanning the image data of the block so as to arrange the image data, such that the arranged image data represents a liner arrangement of dots; and a third process of applying a wavelet transform to the arranged image data representing the liner arrangement of dots and then compressing the arranged image data after applying the wavelet transform so as to reduce an amount of the image data of the block, wherein the second process and the third process are repeatedly applied to the same block using different scan methods defining different patterns of linearly scanning the image data, then an optimum one of the different scan methods is selected, which succeeds in most reducing the amount of the image data, and the compressed image data arranged by the selected scan method is outputted together with indication of the selected scan method.

36. A method of compressing image data representing dots of an image and having either of an RGB format or an index format, the method comprising:

a first process of dividing the image data into a plurality of blocks, so that each block represents n×m dots arranged in rows and columns;

a second process of linearly scanning the image data within the block by a given scan method defining a pattern of linearly scanning the image data of the block so as to arrange the image data, such that the arranged image data represents a liner arrangement of dots;

a third process of applying a wavelet transform to the image data representing the linear arrangement of dots obtained by the second process;

a fourth process of performing quantization of the image data after the wavelet transform;

a fifth process of performing a differential operation on the image data after the quantization; and a sixth process of performing coding of the image data after the differential operation, wherein when the image data has the RGB format, the method repeatedly applies the first process through sixth process to the same block so as to reduce an amount of the image data while using different scan methods defining different patterns of linearly scanning the image data, then selecting an optimum one of the different scan methods, which succeeds in most reducing the amount of the image data, and outputting the compressed image data after arrangement by the selected scan method together with indication of the selected scan method, and wherein when the image data has the index format, the method repeatedly applies the first process, second process, fifth process and sixth process to the same block with skipping the third process and fourth process so as to reduce an amount of the image data while using different scan methods defining different patterns of linearly scanning the image data, then selecting an optimum one of the different scan methods, which succeeds in most reducing the amount of the image data, and, outputting the compressed image data after arrangement by the selected scan method together with indication of the selected scan method.

37. A decompression apparatus for decompressing image data which represents dots of an image and which is provided in a compressed form together with indication of an optimal scan method capable of optimally reducing an amount of compressed image data and actually applied to the image data, which is compressed by a dividing process of dividing the image data into a plurality of blocks, a scanning process of linearly scanning the image data within the block by the optimal scan method defining a pattern of linearly scanning the image data of the block so as to arrange the image data, and a compressing process of applying a wavelet transform to the arranged image data and compressing the arranged image data after applying the wavelet transform so as to reduce an amount of the image data of the block, the apparatus comprising:

a decompressing section that decompresses the image data having the compressed form and applies a reverse wavelet transform to the decompressed image data, so that the decompressed image data after the reverse wavelet transform represents a linear arrangement of dots;

a rearranging section that rearranges the linear arrangement of dots by an order reverse to that defined by the optimal scanning method so as to restore each of the blocks, such that each block represents n×m dots arranged in rows and columns; and a storing section that collectively stores the restored blocks of the image data.

38. A decompression apparatus for decompressing image data which represents dots of an image and which is provided in a compressed form together with indication of an optimal scan method capable of optimally reducing an amount of compressed image data and indication of a format of the image data, which has been compressed by a compression method including a dividing process of dividing the image data into a plurality of blocks, a scanning process of linearly scanning the image data within the block by the optimal scan method defining a pattern of linearly scanning the image data of the block so as to arrange the image data in series, a transform process of applying a wavelet transform to the image data obtained by the scanning process, a quantizing process of performing quantization of the image data after the wavelet transform, a differential process of performing differential operation of the image data after the quantization, and a coding process of performing coding of the image data after the differential operation, the decompression apparatus comprising:

a first decoding section that decodes. the image data by reversely performing the coding applied to the compressed image data;

an adding section that performs adding operation of the decoded image data to remove the differential operation applied to the image data;

a second decoding section being operative when the indication indicates that the image data has an RGB format for performing a reverse quantization and a reverse wavelet transform to the image data fed from the adding section so as to decompress the image data, so that the decompressed image data after the reverse wavelet transform represents a linear arrangement of dots, and being, operative when the indication indicates that the image data has an index format for applying no operation to the image data fed from the adding section;

a rearranging section that rearranges the linear arrangement of dots fed from the second decoding section by an order reverse to that defined by the optimal scanning method so as to restore each of the blocks, such that each block represents n×m dots arranged in rows and columns; and a storing section that stores each of the restored blocks to thereby obtain an expanded form of the compressed image data.

* * * * *